US011973752B2

(12) United States Patent
Crawford et al.

(10) Patent No.: US 11,973,752 B2
(45) Date of Patent: *Apr. 30, 2024

(54) CONNECTION REVOCATION IN OVERLAY NETWORKS

(71) Applicant: strongDM, Inc., New York, NY (US)

(72) Inventors: Britt Vandermast Crawford, Bend, OR (US); Philip D. Hassey, Rye, CO (US); Alexander Chidi Okafor, Kennesaw, GA (US)

(73) Assignee: strongDM, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,649

(22) Filed: Aug. 28, 2023

(65) Prior Publication Data

US 2024/0106821 A1    Mar. 28, 2024

Related U.S. Application Data

(63) Continuation of application No. 17/954,697, filed on Sep. 28, 2022, now Pat. No. 11,765,159.

(51) Int. Cl.
*H04L 9/40*  (2022.01)
(52) U.S. Cl.
CPC ................ *H04L 63/0853* (2013.01)
(58) Field of Classification Search
CPC .................................................. H04L 63/0853
USPC ............................................................ 726/4
See application file for complete search history.

(56) References Cited

U.S. PATENT DOCUMENTS

| 7,233,569 | B1 * | 6/2007 | Swallow ............... H04L 47/825 370/225 |
|---|---|---|---|
| 7,752,466 | B2 | 7/2010 | Ginter et al. |
| 7,886,339 | B2 | 2/2011 | Keohane et al. |
| 8,102,814 | B2 | 1/2012 | Rahman et al. |
| 8,135,815 | B2 | 3/2012 | Mayer |
| 9,082,402 | B2 | 7/2015 | Yadgar et al. |

(Continued)

OTHER PUBLICATIONS

Office Communication for U.S. Appl. No. 17/733,735 mailed Jul. 12, 2022, pp. 1-38.

(Continued)

*Primary Examiner* — Anthony D Brown
(74) *Attorney, Agent, or Firm* — John W. Branch; Branch Partners PLLC

(57) ABSTRACT

Embodiments are directed to connection revocation in overlay networks. An overlay network may be employed to provide secure tunnels between clients and resources. In response to a privilege evaluation event, performing further actions, including: determining sessions associated with the secure tunnels; determining users and a portion of the resources based on the sessions such that each determined user and each determined resource are associated with a same session; comparing privilege information associated with each determined user with privilege requirements associated with each determined resource. In response to determining one or more mismatches of the privilege information and the privilege requirements based on the comparison, performing further actions, including: determining revocable sessions based on the mismatches; providing revoke messages to agents such that the agents close connections associated with the revocable sessions.

20 Claims, 14 Drawing Sheets

(56) References Cited

U.S. PATENT DOCUMENTS

| | | |
|---|---|---|
| 9,178,793 B1 | 11/2015 | Marlow |
| 9,239,834 B2 | 1/2016 | Donabedian et al. |
| 9,300,635 B1 | 3/2016 | Gilde et al. |
| 9,632,828 B1* | 4/2017 | Mehta .................. G06F 9/5011 |
| 9,800,517 B1 | 10/2017 | Anderson |
| 10,075,334 B1 | 9/2018 | Kozura et al. |
| 10,110,593 B2 | 10/2018 | Karroumi et al. |
| 10,117,098 B1 | 10/2018 | Naguthanawala et al. |
| 10,292,033 B2 | 5/2019 | Beyer, Jr. et al. |
| 10,645,562 B2 | 5/2020 | Beyer, Jr. |
| 10,735,263 B1 | 8/2020 | McAlary et al. |
| 11,075,747 B1 | 7/2021 | Holsman |
| 11,102,147 B2 | 8/2021 | Mehta et al. |
| 11,290,143 B1 | 3/2022 | Sternowski |
| 11,316,822 B1 | 4/2022 | Gawade et al. |
| 11,323,919 B1 | 5/2022 | Parulkar et al. |
| 11,375,300 B2 | 6/2022 | Sagie et al. |
| 11,412,051 B1 | 8/2022 | Chiganmi et al. |
| 11,431,497 B1 | 8/2022 | Liguori et al. |
| 11,521,444 B1 | 12/2022 | Badik et al. |
| 11,528,147 B2 | 12/2022 | Madisetti et al. |
| 11,546,323 B1 | 1/2023 | Jones et al. |
| 11,546,763 B1 | 1/2023 | Cirello Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 11,729,620 B1 | 8/2023 | Cirello Filho et al. |
| 11,736,531 B1 | 8/2023 | Cirello Filho et al. |
| 11,765,159 B1 | 9/2023 | Crawford et al. |
| 11,765,207 B1 | 9/2023 | McCarthy |
| 11,784,999 B1 | 10/2023 | Jones et al. |
| 2005/0164650 A1 | 7/2005 | Johnson |
| 2005/0209876 A1 | 9/2005 | Kennis et al. |
| 2006/0190991 A1 | 8/2006 | Iyer |
| 2006/0212487 A1 | 9/2006 | Kennis et al. |
| 2006/0240824 A1 | 10/2006 | Henderson et al. |
| 2006/0288204 A1 | 12/2006 | Sood et al. |
| 2007/0009104 A1 | 1/2007 | Renkis |
| 2009/0037607 A1 | 2/2009 | Farinacci et al. |
| 2009/0164663 A1 | 6/2009 | Ransom et al. |
| 2009/0222559 A1 | 9/2009 | Anipko et al. |
| 2011/0225311 A1 | 9/2011 | Liu et al. |
| 2012/0304265 A1 | 11/2012 | Richter et al. |
| 2013/0173794 A1 | 7/2013 | Agerbak et al. |
| 2013/0198558 A1 | 8/2013 | Rao et al. |
| 2013/0268260 A1 | 10/2013 | Lundberg et al. |
| 2014/0044265 A1 | 2/2014 | Kocher et al. |
| 2014/0057676 A1 | 2/2014 | Lord et al. |
| 2014/0136970 A1 | 5/2014 | Xiao |
| 2015/0127949 A1 | 5/2015 | Patil et al. |
| 2015/0135300 A1 | 5/2015 | Ford |
| 2015/0208273 A1 | 7/2015 | Raleigh et al. |
| 2015/0281952 A1 | 10/2015 | Patil et al. |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0080128 A1 | 3/2016 | Hebron et al. |
| 2016/0173501 A1 | 6/2016 | Brown |
| 2016/0180102 A1 | 6/2016 | Kim et al. |
| 2016/0262021 A1 | 9/2016 | Lee et al. |
| 2016/0294826 A1 | 10/2016 | Han et al. |
| 2016/0314355 A1 | 10/2016 | Laska et al. |
| 2017/0061956 A1 | 3/2017 | Sarikaya et al. |
| 2017/0103440 A1 | 4/2017 | Xing et al. |
| 2017/0111368 A1 | 4/2017 | Hibbert et al. |
| 2017/0126734 A1 | 5/2017 | Harney |
| 2017/0142810 A1 | 5/2017 | Cho |
| 2017/0279971 A1* | 9/2017 | Raleigh ................ H04W 60/06 |
| 2017/0339561 A1 | 11/2017 | Wennemyr et al. |
| 2017/0364505 A1 | 12/2017 | Sarikaya et al. |
| 2017/0372087 A1 | 12/2017 | Lee |
| 2018/0061158 A1 | 3/2018 | Greene |
| 2018/0123957 A1 | 5/2018 | Chen et al. |
| 2018/0167373 A1 | 6/2018 | Anderson et al. |
| 2018/0233141 A1 | 8/2018 | Solomon et al. |
| 2018/0288026 A1 | 10/2018 | Callaghan |
| 2018/0359369 A1 | 12/2018 | Golshenas et al. |
| 2018/0367308 A1 | 12/2018 | Kacin et al. |
| 2019/0039569 A1 | 2/2019 | Reed et al. |
| 2019/0073373 A1 | 3/2019 | Surale et al. |
| 2019/0075095 A1 | 3/2019 | Venable et al. |
| 2019/0104411 A1 | 4/2019 | Hotchkiss et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0349758 A1 | 11/2019 | Zhu et al. |
| 2020/0007540 A1 | 1/2020 | Kawaguchi et al. |
| 2020/0219023 A1 | 7/2020 | Duchastel |
| 2020/0220848 A1 | 7/2020 | Patwardhan |
| 2020/0257179 A1 | 8/2020 | Barnum et al. |
| 2020/0267552 A1 | 8/2020 | Lee et al. |
| 2020/0272911 A1 | 8/2020 | Quiros Araya et al. |
| 2020/0296779 A1 | 9/2020 | Moghe et al. |
| 2020/0322286 A1 | 10/2020 | Mehta et al. |
| 2020/0323030 A1 | 10/2020 | Mehta et al. |
| 2020/0382488 A1 | 12/2020 | Liu et al. |
| 2021/0056524 A1 | 2/2021 | Isgar |
| 2021/0056536 A1 | 2/2021 | Carter et al. |
| 2021/0091941 A1 | 3/2021 | Pancras et al. |
| 2021/0168661 A1 | 6/2021 | Wong et al. |
| 2021/0211423 A1 | 7/2021 | Tan et al. |
| 2021/0223128 A1 | 7/2021 | Kirch |
| 2021/0224091 A1 | 7/2021 | Hayatnagarkar et al. |
| 2021/0226910 A1 | 7/2021 | Ranpise et al. |
| 2021/0281572 A1 | 9/2021 | Fernandez-Spadaro et al. |
| 2021/0294970 A1 | 9/2021 | Bender et al. |
| 2021/0306310 A1 | 9/2021 | Tan |
| 2021/0312400 A1 | 10/2021 | Irimie et al. |
| 2021/0314399 A1 | 10/2021 | Hyun et al. |
| 2021/0344492 A1 | 11/2021 | Goodsitt et al. |
| 2021/0406902 A1 | 12/2021 | Bernert et al. |
| 2022/0007437 A1 | 1/2022 | Goenka et al. |
| 2022/0038544 A1 | 2/2022 | Grinstein et al. |
| 2022/0052850 A1 | 2/2022 | Fagan et al. |
| 2022/0086639 A1 | 3/2022 | Lu et al. |
| 2022/0150312 A1 | 5/2022 | Ranpise et al. |
| 2022/0159029 A1 | 5/2022 | Bendersky et al. |
| 2022/0217084 A1 | 7/2022 | Arora et al. |
| 2022/0263913 A1 | 8/2022 | Zhang et al. |
| 2022/0294540 A1 | 9/2022 | Black et al. |
| 2022/0311767 A1 | 9/2022 | Ouellet |
| 2022/0329477 A1 | 10/2022 | Chiganmi et al. |
| 2022/0334864 A1 | 10/2022 | K N et al. |
| 2023/0007439 A1 | 1/2023 | Williams et al. |
| 2023/0027507 A1 | 1/2023 | He et al. |
| 2023/0032790 A1 | 2/2023 | Mahajan et al. |
| 2023/0059173 A1 | 2/2023 | Moon |
| 2023/0067223 A1 | 3/2023 | Freed et al. |
| 2023/0153447 A1 | 5/2023 | Kapadia |

OTHER PUBLICATIONS

Office Communication for U.S. Appl. No. 17/733,735 mailed Nov. 1, 2022, pp. 1-7.

Office Communication for U.S. Appl. No. 17/889,788 mailed Nov. 7, 2022, pp. 1-12.

Office Communication for U.S. Appl. No. 17/954,697 mailed Jan. 20, 2023, pp. 1-13.

Office Communication for U.S. Appl. No. 18/094,858 mailed Mar. 16, 2023, pp. 1-10.

Office Communication for U.S. Appl. No. 18/091,006 mailed Mar. 31, 2023, pp. 1-12.

Office Communication for U.S. Appl. No. 17/900,121 mailed Apr. 4, 2023, pp. 1-13.

Office Communication for U.S. Appl. No. 18/091,895 mailed Apr. 5, 2023, pp. 1-12.

Office Communication for U.S. Appl. No. 18/091,006 mailed Apr. 19, 2023, pp. 1-9.

Office Communication for U.S. Appl. No. 17/954,697 mailed May 12, 2023, pp. 1-5.

Office Communication for U.S. Appl. No. 18/131,151 mailed Jun. 8, 2023, pp. 1-9.

(56) References Cited

OTHER PUBLICATIONS

Office Communication for U.S. Appl. No. 18/094,858 mailed Jul. 7, 2023, pp. 1-12.
Office Communication for U.S. Appl. No. 18/131,151 mailed Jul. 10, 2023, pp. 1-7.
Office Communication for U.S. Appl. No. 18/091,895 mailed Jul. 11, 2023, pp. 1-9.
Office Communication for U.S. Appl. No. 18/094,858 mailed Sep. 19, 2023, 4 Pages.
Office Communication for U.S. Appl. No. 18/236,360 mailed Oct. 25, 2023, 12 pages.
Office Communication for U.S. Appl. No. 18/236,360 mailed Nov. 13, 2023, 2 pages.
Office Communication for U.S. Appl. No. 18/094,858 mailed Oct. 25, 2023, 7 pages.

\* cited by examiner

CONNECTION REVOCATION IN OVERLAY NETWORKS

CROSS-REFERENCE TO RELATED APPLICATIONS

This Utility Patent Application is a Continuation of U.S. patent application Ser. No. 17/954,697 filed on Sep. 28, 2022, the benefit which is hereby claimed under 35 U.S.C. § 120 and the contents of which is further incorporated in entirety by reference.

TECHNICAL FIELD

The present invention relates generally to network security, and more particularly, but not exclusively, to connection revocation in overlay networks.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Credential management is an important feature of infrastructure security. In some cases, changes to access privileges may predictably or spontaneously occur. In some cases, such changes to access privileges may result in one or more users being disqualified from accessing resources that may be currently accessing. Accordingly, in some embodiments, given the distributed nature of responsibilities in distributed network environment, rapidly identifying these users or affected resources may be challenging. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
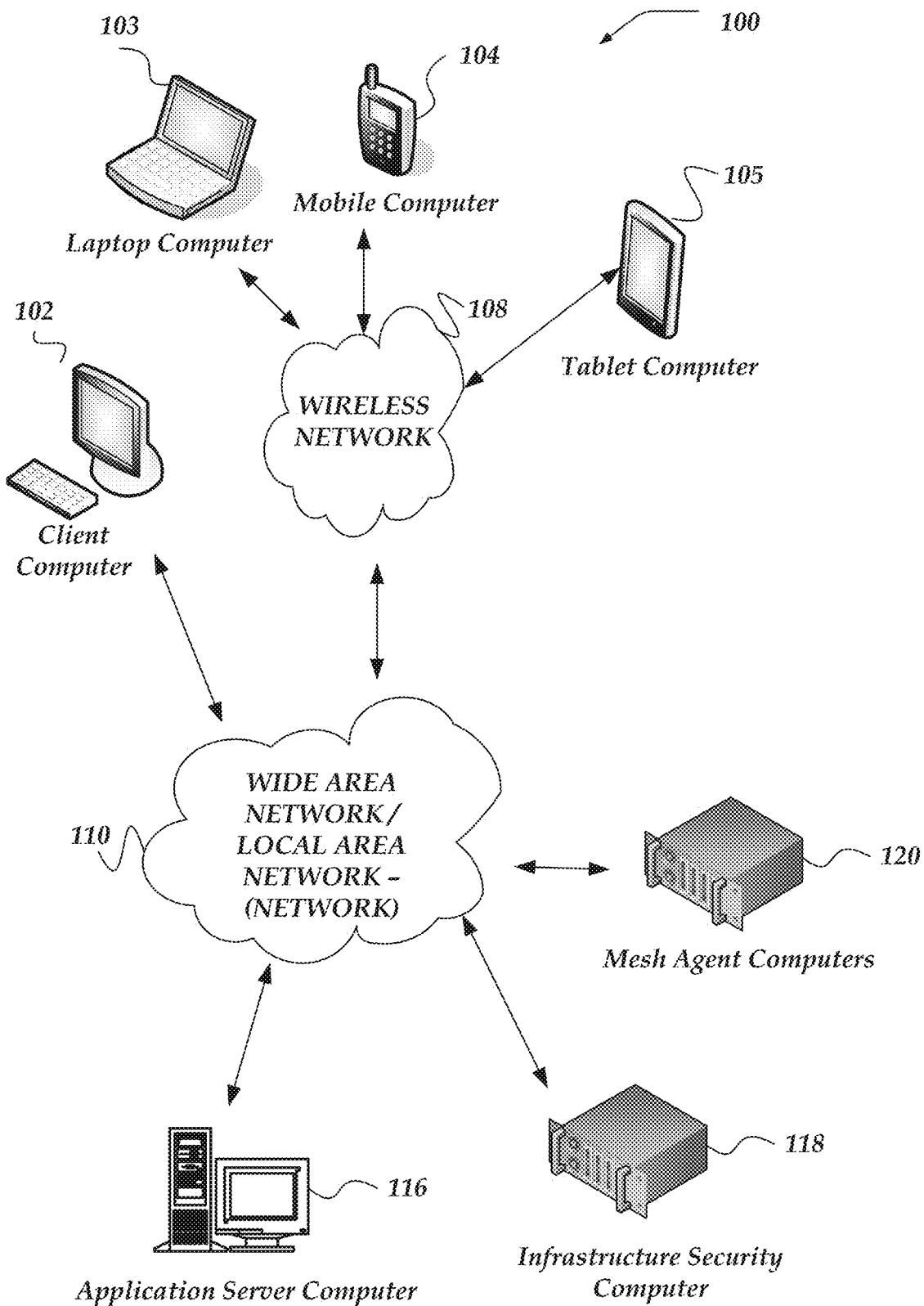
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential vault" refers to services or systems organizations may employ to manage credential secrets that may be used to access various resources in protected networks. Credential vaults may include user directories, LDAP servers, file systems, password managers, configuration databases, or the like. Credential vaults may provide one or more schemes or interfaces that enable programmatic access to the credential secrets stored in a credential vault.

As used herein, the term "credential information" refers to data or data structures that include credential secrets that enable access to protected resource servers. For example, credential information may include usernames, passwords, pass-phrases, security certificates, or the like.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to connection revocation in overlay networks. In one or more of the various embodiments, an overlay network may be employed to provide one or more secure tunnels between one or more clients and one or more resources.

In one or more of the various embodiments, in response to a privilege evaluation event, performing further actions, including: determining one or more sessions associated with the one or more secure tunnels; determining one or more users and a portion of the one or more resources based on the one or more sessions such that each determined user and each determined resource are associated with a same session; comparing privilege information associated with each determined user with one or more privilege requirements associated with each determined resource, or the like.

In one or more of the various embodiments, in response to determining one or more mismatches of the privilege information and the one or more privilege requirements based on the comparison, performing further actions, including: determining one or more revocable sessions based on the one or more mismatches; providing one or more revoke messages to one or more agents such that the one or more agents close one or more connections associated with the one or more revocable sessions; or the like.

In one or more of the various embodiments, comparing privilege information associated with each determined user with the one or more privilege requirements associated with each determined resource further comprises: determining a role that may be associated with each determined user, wherein the privilege information is associated with the role; determining one or more user privilege attributes for each determined user from the privilege information associated with the role associated with each user; determining a resource type that may be associated with each determined resource, wherein the one or more privilege requirements are associated with the resource type; determining one or more resource privilege attributes for each determined resource from the one or more privilege requirements associated with the resource requirements associated with each resource; determining the one or more mismatches based on one or more of one or more resource privilege attributes being absent from the one or more user privilege attributes; or the like.

In one or more of the various embodiments, in response to being provided the one or more revoke messages, the one or more agents may perform further actions, including: determining one or more session identifiers that may be included in the one or more revoke messages; determining one or more network connections associated with the one or more session identifiers; employing one or more communication protocol messages to terminate the one or more network connections; or the like.

In one or more of the various embodiments, in response to being provided the one or more revoke messages, the one or more agents perform further actions, including: terminating one or more network connections associated with the one or more revoke messages; determining one or more other agents in the overlay network based on a proximity of the one or more agents to the one or more other agents; forwarding the one or more revoke messages from the one or more agents to the one or more other agents; or the like.

In one or more of the various embodiments, in response to an expiry of a timeout associated with a session, an agent may perform further actions, including: determining a session identifier associated with the expired timeout; communicating a re-authorization request to an infrastructure security computer (ISC) such that the re-authorization request includes the session identifier; in response to non-authorization by the ISC for the re-authorization request, terminating the session; or the like.

In one or more of the various embodiments, in response to one or more of privilege information associated with a user being modified or one or more privilege requirements associated with the one or more resources being modified, initiating the privilege evaluation event.

In one or more of the various embodiments, in response to an expiry of a scheduled time duration, initiating the privilege evaluation event.

In one or more of the various embodiments, in response to a lifetime of a session exceeding a threshold value, initiating the privilege evaluation event.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
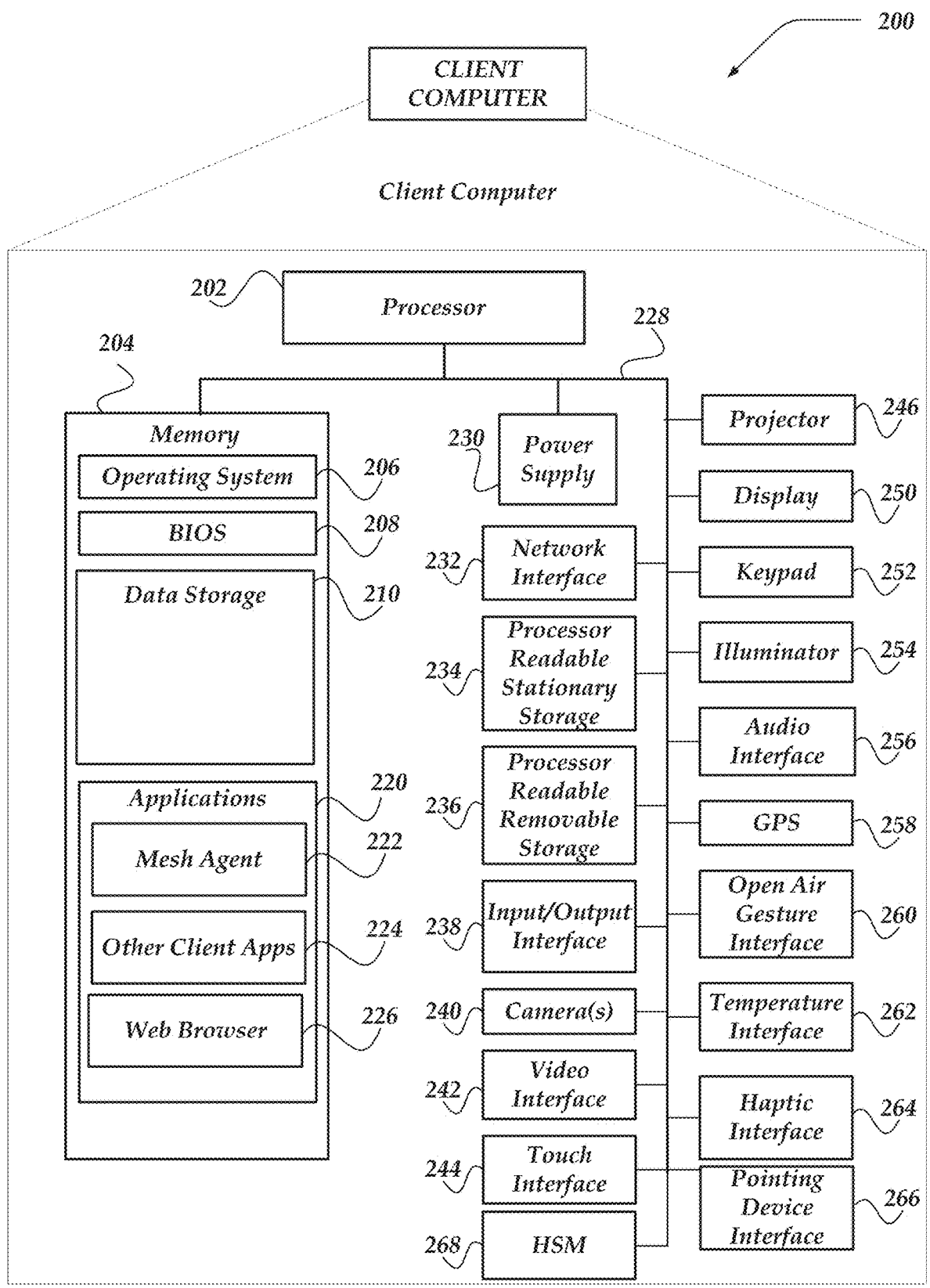
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
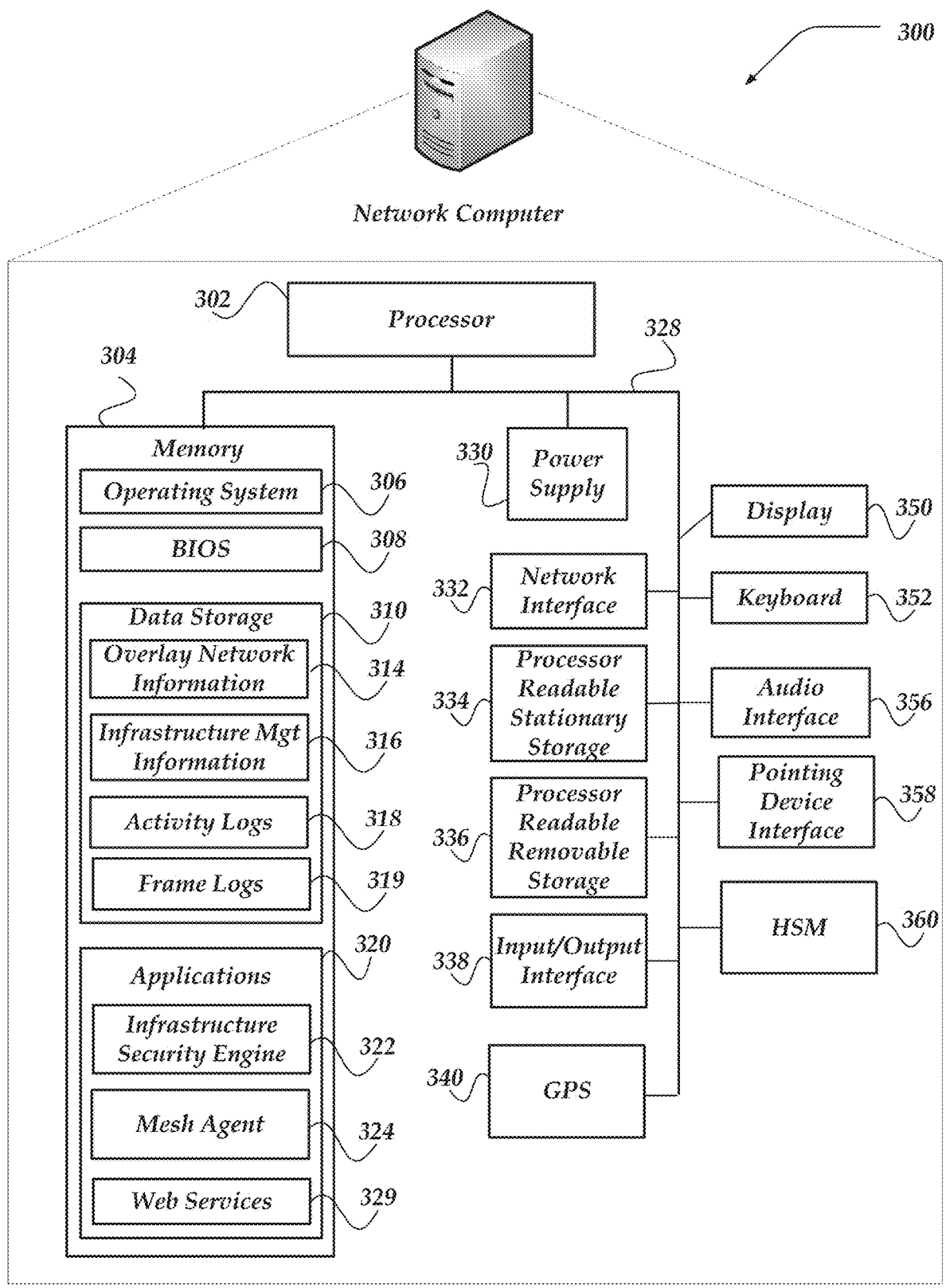
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, infrastructure network information 314, infrastructure management information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure network engine 322, mesh agent 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, web services 329, or the like, may be provisioned and de-commissioned automatically.

Also, in one or more of the various embodiments, infrastructure security engine 322, mesh agent 324, web services 329, or the like, may be located in virtual servers running in a cloud-based computing environment rather than being tied to one or more specific physical network computers. Likewise, in some embodiments, one or more of infrastructure security engine 322, mesh agent 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
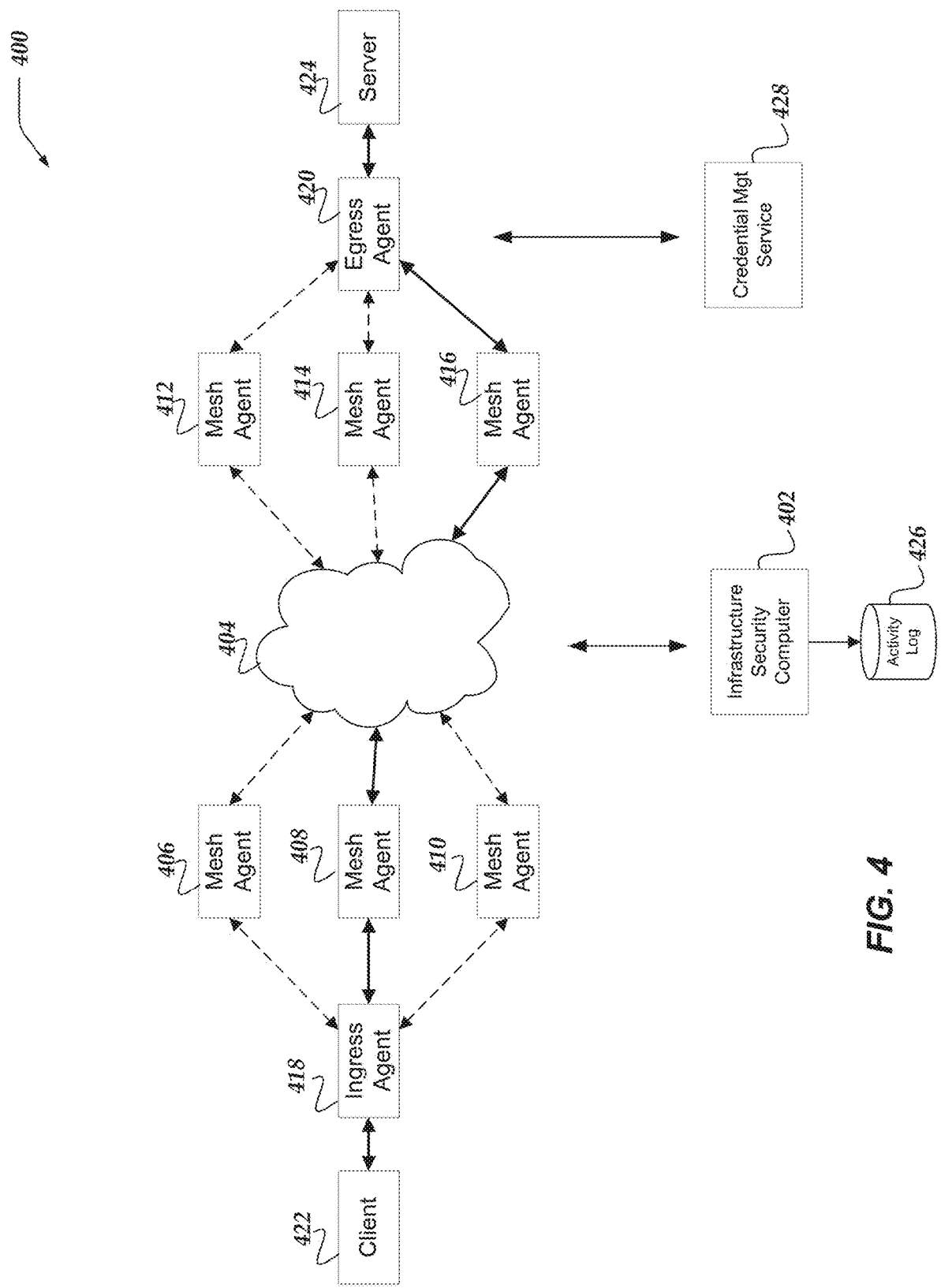
FIG. 4 illustrates a logical architecture of a system for connection revocation in overlay networks in secured networks in accordance with one or more of the various embodiments.

FIG. 4 illustrates a logical architecture of system 400 for connection revocation in overlay networks in secured networks in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; one or more credential management services, such as, credential management service 428, or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in an networked environment.

In one or more of the various embodiments, if a client employs an mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths that go from mesh agent-to-mesh agent until the target server may be reached.

In one or more of the various embodiments, mesh agents may establish cryptographically secure virtual network tunnels between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. However, for brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, as client communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Also, in one or more of the various embodiments, egress agents, such as, egress agent 420 may be enabled to access resource servers or other services using credentials that may be provided from a credential management service, such as, credential management service 428. Accordingly, in some embodiments, infrastructure security computers, such as, infrastructure security computer 402 may be enabled to provide credential instructions to egress agents that require credentials to access target resources. In some embodiments, egress agents may be arranged to request or otherwise obtain credential instructions from infrastructure security computers. In some embodiments, the credential instructions may be acted upon by egress agents to enable access to protected target resources. Note, in some embodiments, credential instructions may dictate the one or more actions an egress agent may perform to obtain or utilize credentials that enable the egress agent to access protected resources. In some embodiments, the credential instructions may enable egress agents to activate or authenticate a client application that interacts with the target resource.

Further, in some embodiments, one or more portions of application protocol information forwarded from client 422 or ingress agent 418 may be incorporated with credential instructions to enable access to target resource servers.

Note, in some embodiments, innovations disclosed herein may be employed with different overlay networks or in different network environments. System 400 is disclosed to provide an example of an overlay network where the disclosed innovations may be applied. One of ordinary skill in the art will appreciate that innovations disclosed herein are applicable for other overlay network embodiments.

Figure 5:
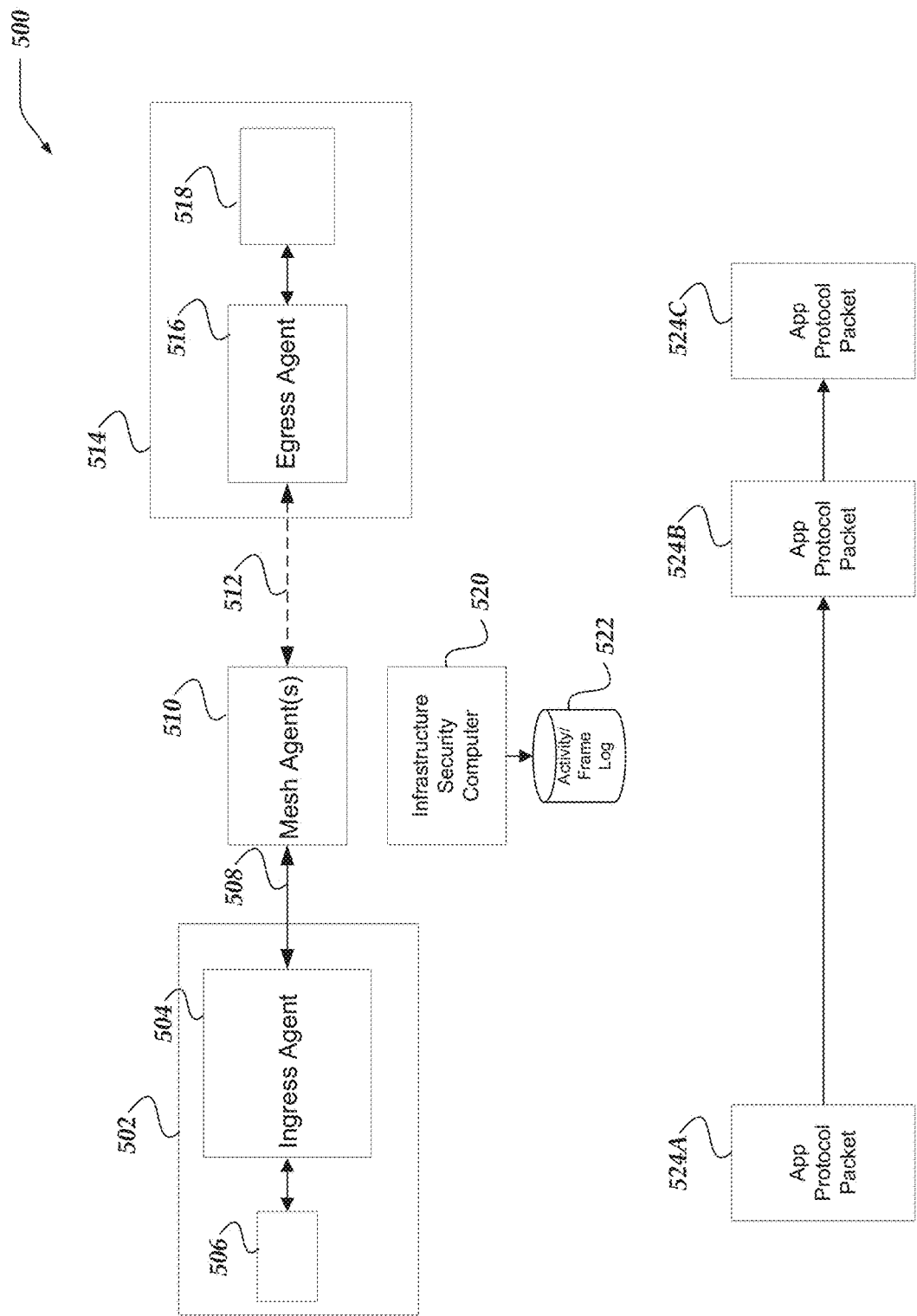
FIG. 5 illustrates a logical schematic of a system for connection revocation in overlay networks in secured networks in accordance with one or more of the various embodiments.

FIG. 5 illustrates a logical schematic of system 500 for connection revocation in overlay networks in secured networks in accordance with one or more of the various embodiments. In this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as, client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, egress agents may be arranged to re-write application protocol packets to enforce one or more requirements or one or more features of the overlay network. For example, if an application protocol defines one or more fields for holding credential information, egress agents may be arranged to insert the appropriate credential information into the application protocol packets before communicating them to the target resource server. Thus, in some embodiments, credential information provided by the client (if any) may be automatically replaced by other credential information determined by the egress agent.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represent a modified packet that includes credential information as well as other packet modifications that may be required for a particular application protocol or credential mechanism.

Figure 6:
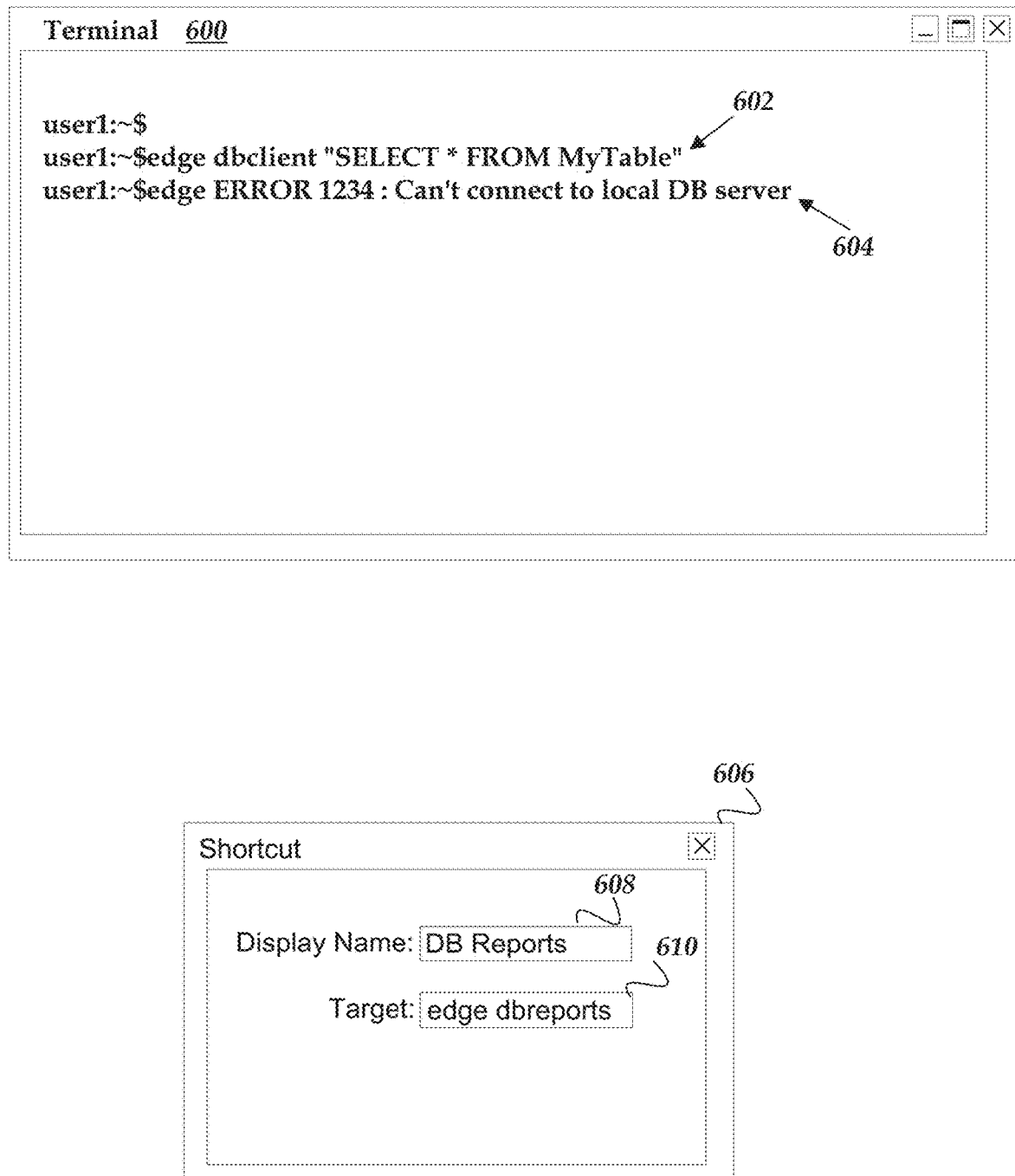
FIG. 6 illustrates a logical schematic of a terminal and a shortcut for connection revocation in overlay networks in secured networks in accordance with one or more of the various embodiments.

FIG. 6 illustrates a logical schematic of terminal 600 and shortcut 606 for connection revocation in overlay networks in secured networks in accordance with one or more of the various embodiments. In some embodiments, terminal 600 may represent a computer terminal application that enables users access to command-line interfaces for various applications. In this example, for some embodiments, command line 602 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 606 illustrates how a shortcut for a GUI based operating system or window manager may be configured to route commands initiated from a desktop (e.g., mouse-clicks) through secure tunnels in the overlay network. In this example, shortcut 606 includes an application display name, such as, display name 608 and a launch/execution command represented by target 610. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 7:
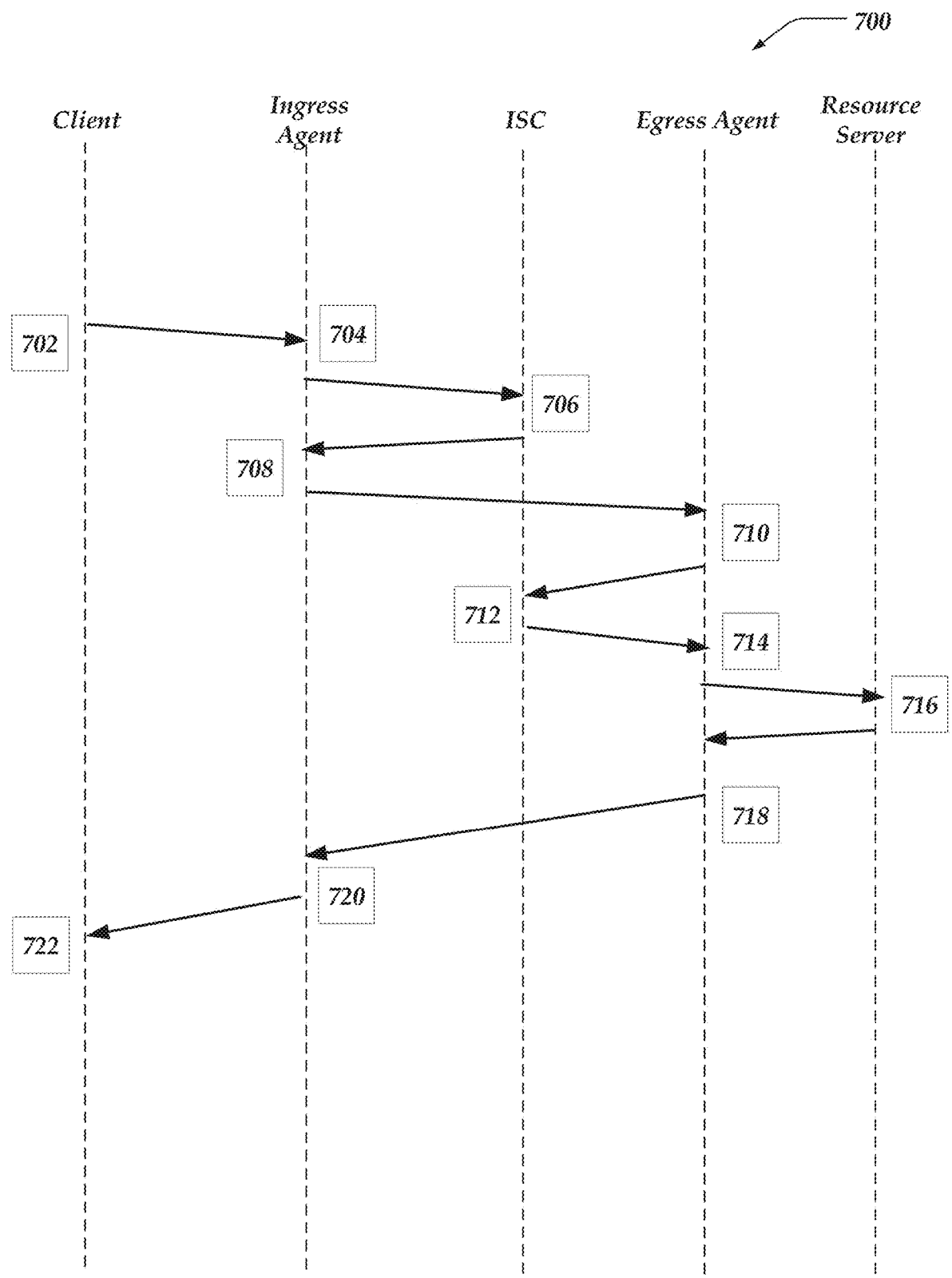
FIG. 7 illustrates a logical diagram of a sequence for connection revocation in overlay networks in accordance with one or more of the various embodiments.

FIG. 7 illustrates a logical diagram of sequence 700 for connection revocation in overlay networks in accordance with one or more of the various embodiments. In one or more of the various embodiments, sequence 700 illustrates interactions between or among clients, servers, ingress agents, egress agents, infrastructure security engines, or the like. As described above, in some embodiments, ingress agents and egress agents may be mesh agents that are providing access to the overlay network for clients or services. Similarly, clients may be resources that are initiating a request directed to another resource and servers may be resources that may respond to a client request. Accordingly, resources may be clients or servers depending on their role at a particular moment.

At step 702, in one or more of the various embodiments, a client service may provide a request to access a managed resource or service. (Services or resources may hereinafter be referred to collectively as resources.) Also, resources that a client may be attempting to communicate with may be referred to as target resources.

As described above, managed resources may be accessible via mesh agents. Accordingly, in some embodiments, the mesh agent associated with the client may be considered the ingress agent that enables the client to gain access to the overlay network.

At step 704, in one or more of the various embodiments, the ingress agent associated with the client may communicate with an infrastructure security computer that may be hosting one or more infrastructure security engines. In one or more of the various embodiments, this communication may include an authorization request to determine if the client may be enabled to reach the target resource via the overlay network.

In one or more of the various embodiments, the communication may include information for identifying the user and the target resource. In some embodiments, the infrastructure security computer may determine if the user has sufficient privileges to access the target resource. Accordingly, in some embodiments, infrastructure security computers may be arranged to execute one or more privilege rules to determine if a user has sufficient privileges to access the request target resource. In some embodiments, infrastructure security computers may be arranged to determine privilege rules based on rules, instructions, or the like, provided via configuration information to account for one or more local circumstances or one or more local requirements.

In some embodiments, the infrastructure security computer may be arranged to determine a role associated with user requesting access to the target resource. In some embodiments, infrastructure security computers may be arranged to maintain a table or other data structure that maps user identifiers to user roles.

In some embodiments, infrastructure security computers may be arranged to determine a collection of privilege rules that may be associated with the user's role. For example, in some embodiments, privilege rules associated with a role may declare one or more privilege tags.

Also, in some embodiments, infrastructure security computers may be arranged to determine a resource type for the target resource. In some embodiments, the infrastructure security computer may be arranged to determine one or more privilege rules associated with the resource type associated with the target resource. For example, in some embodiments, privilege rule associated with a resource type may declare one or more privilege tags.

Further, in some embodiments, one or more users may be associated with one or more custom privilege rules. For example, in some embodiments, one or more custom privilege rules may declare one or more privilege tags that may be separate from the privilege tags declared by the privilege rules associated with the user's role.

Likewise, in some embodiments, one or more resources may be associated with one or more custom privilege rules. For example, in some embodiments, one or more custom privilege rules may declare one or more privilege tags that may be separate from the privilege tags associated with the resource type of the target resource.

Accordingly, in some embodiments, one or more privilege rules may require each privilege tag associated with the target resource to be included in the privilege tags associated with the user. Thus, in some embodiments, infrastructure security computers may authorize requests to access a target resource the one or more privilege rules may be satisfied. In contrast, in some embodiments, if the target resource is associated with a privilege tag that may be absent from the privilege tags associated with the user, the request to access the target resource may be declined or rejected.

At step 706, in one or more of the various embodiments, the infrastructure security computer may respond to the authentication request. In one or more of the various embodiments, if the client may be enabled to access the server, the infrastructure security computer may respond with the approval and a table of one or more routes to one or more mesh agents in the overlay network. In contrast, in some embodiments, if the client may be disabled from accessing the server, the infrastructure security computer may decline the approval request.

At step 708, in one or more of the various embodiments, if the request to access the server may be approved by the infrastructure security computer, the ingress agent may forward the client request to a next mesh agent as determined from route information from the route table that was provided by the infrastructure security computer.

Note, in this example, sequence 700 shows a ingress agent for the client communicating directly with the egress agent for the resource server. In practice, there may be zero or more intervening mesh agents depending on the configuration of the overlay network. However, for brevity and clarity intervening mesh agents are omitted from sequence 700. In some embodiments, each intervening mesh agent, if any, may be arranged to communicate with the infrastructure security computer to confirm if a client can reach the intended server and obtain next hop information similar as described for the ingress agent.

At step 710, in one or more of the various embodiments, the client request may be provided to the egress agent. Accordingly, in some embodiments, similar to other mesh agents participating in the connection/session, the egress agent may confirm that the client is authorized to access the target resource.

Also, in one or more of the various embodiments, the egress agent may request the user credentials for accessing the resource. In some embodiments, in some embodiments, the particular credentials or the form of the credentials may be determined based on the type of resource or server being accessed. For example, some servers may support/require cryptographic certificates while other servers may require a username and password. In some embodiments, egress agent may be arranged to obtain the user credentials from the infrastructure security computer.

At step 712, in one or more of the various embodiments, the infrastructure security computer may determine if the client can access the resource server. Also, in some embodiments, since this request is coming from the egress agent, the infrastructure security computer may be arranged to provide login credentials (if any) for the resource server. For example, in some embodiments, if a username and password may be required to respond to the client request, the infrastructure security computer may provide a username and password to the egress agent.

At step 714, in one or more of the various embodiments, if the infrastructure security computer authenticates the user, the infrastructure security computer may provide user credentials to the egress agent. Accordingly, in some embodiments, the egress agent may forward the client request with the user credentials to the resource server.

At step 716, in one or more of the various embodiments, the resource server may receive the client request with credentials provided from the egress agent. Accordingly, in some embodiments, the resource server may process the client request. In one or more of the various embodiments, if the resource server provides a response, the response may be forwarded to the egress agent.

At step 718, in one or more of the various embodiments, the egress agent may be arranged to forward the resource server response back through a secure tunnel in the overlay network towards the ingress agent that corresponds to the client. In some embodiments, the resource server response may be forwarded through one or more intervening mesh agents that were determined to establish the secure tunnel between the egress agent and the ingress agent rather than validating the resource server response with the infrastructure security computer at each mesh agent.

Accordingly, in one or more of the various embodiments, mesh agents may be arranged to employ the secure tunnel for the session without validating the client or secure tunnel with the infrastructure security computer based on the validation/authentication performed to establish the secure tunnel.

Also, in one or more of the various embodiments, mesh agents may be configured to periodically confirm or validate that the secure tunnel remains valid. In some embodiments, infrastructure security engines may be arranged to configure different on-going validation policies for different resources, sub-networks, clients, applications, or the like. For example, a default policy may require mesh agents to check if sessions remain valid every 60 seconds while sessions associated with sensitive resources may be configured check if sessions remain valid every 15 seconds.

Further, in some embodiments, infrastructure security computers may be arranged to proactively share policy updates with one or more mesh agents. Accordingly, in some embodiments, an updated policy may result in an existing secure session tunnel being invalidated. For example, in some embodiments, if a user associated with an active secure tunnel may be disqualified for one or more reasons, the mesh agents may terminate the secure tunnel and refrain from forwarding traffic between the ingress agent and egress agent. Note, as described herein, ingress agents and egress agents may be considered mesh agents. Accordingly, in some embodiments, updates to policies, periodic validity checks, or the like, may be performed by ingress agents and egress agent because they are both mesh agents.

In one or more of the various embodiments, egress agents may be arranged to generate activity information associated with the communication that may occur between the client and resource server. In some embodiments, egress agents may be configured to generate different amounts of activity information that may be log or stored differently. Accordingly, in some embodiments, activity information may be one or more of transport protocol packet captures, application protocol captures, one or more application metrics, one or more session/communication metrics, abbreviated summaries, or the like.

Also, in some embodiments, egress agents may be arranged to generate a authenticity tokens based on fingerprint values that may be based on the activity information that corresponds to client/server communication. For example, in some embodiments, mesh agents may be arranged to generate a digest based on hashing the payloads associated client requests or server responses. In some embodiments, mesh agents may be arranged to generate fingerprint information that may correspond with activity information that is being logged. For example, portions of log information or fingerprint information may be associated with one or more identifiers, such as, timestamps, serial numbers, sequence numbers, GUIDs, or the like, that enable the correspondence of fingerprint information and log information.

In some embodiments, mesh agents may be arranged to forward authenticity tokens to a central log service or the infrastructure security computer for preservation. In some embodiments, infrastructure security computers may be arranged to enable organizations to configure activity logging. In some embodiments, activity logging configurations may include: logging authenticity tokens via the infrastructure security computer, logging authenticity tokens and detailed activity via the infrastructure security computer, logging authenticity tokens via the infrastructure security computer and detailed activity via another logging service. Accordingly, in some embodiments, organizations may configure the infrastructure security engine to store detailed logging activity in a local data store or file system while the authenticity tokens may be stored in data store managed by the infrastructure security engine. In some embodiments, the authenticity tokens may be employed to validate detailed activity logs because the authenticity tokens may include a cryptographic digest of the detailed activity logs. Thus, in some embodiments, the authenticity tokens may be employed to determine if their corresponding detailed activity logs have been tampered with or modified.

At step 720, in one or more of the various embodiments, the ingress agent may receive the server response and forward it to the client.

At this point, additional communication for the client-server session may occur in the established over the overlay network via the secure tunnel. Accordingly, in some embodiments, the secure tunnel may be employed to route traffic between the client and server. As described above, (e.g., step 718) mesh agents that may be participating in the secure tunnel may periodically or occasionally determine if the secure tunnel should remain available. Thus, in some embodiments, the communication may continue until the client-server session may be terminated by the client or server or the until the secure tunnel may be disqualified/disabled by policies provided by the infrastructure security computer.

Figure 8:
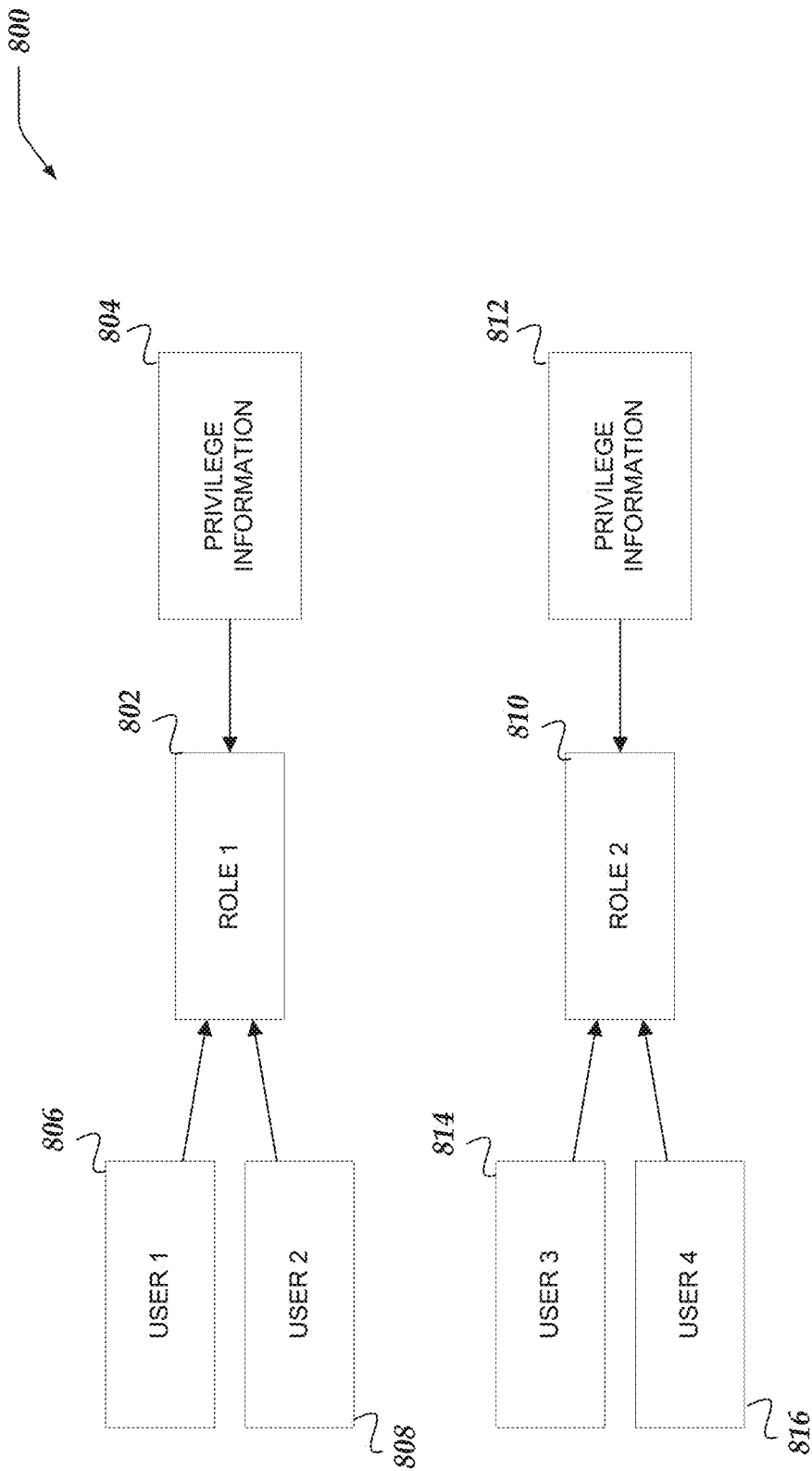
FIG. 8 illustrates a logical schematic of a system for connection revocation in overlay networks in accordance with one or more of the various embodiments.

FIG. 8 illustrates a logical schematic of system 800 for connection revocation in overlay networks in accordance with one or more of the various embodiments. As described above, in some embodiments, infrastructure security computers in an overlay network may be arranged to authenticate/authorize if users may access various resources via the overlay network. In some embodiments, if a user may be authorized to access a resource in the overlay network, the overlay network may establish a secure tunnel through the overlay network that logically connects a mesh agent associated with the user (e.g., ingress agent) with another mesh agent associated with the target resource (e.g., egress agent).

Accordingly, in some embodiments, during the establishment of the secure tunnel between the ingress agent and the egress mesh agent, mesh agents involved in the secure tunnel (including the ingress mesh agent and the egress mesh agent) may be arranged to communicate with infrastructure security computers to determine if the user may be authorized to access the overlay network in general and the target resource specifically.

In one or more of the various embodiments, users of an overlay network may be associated with one or more declared user roles (e.g., roles). In some embodiments, infrastructure security computers may be arranged to enable organizations to declare one or more user roles to satisfy local requirements or local circumstances. In some embodiments, infrastructure security computers may be configured to include one or more "default" user roles as a convenience. Accordingly, in some embodiments, infrastructure security computers may be arranged to determine some or all user roles based on configuration information to account for local requirements or local circumstances. For example, in some embodiments, user roles may include, users, administrator, operator, customer, or the like.

In one or more of the various embodiments, infrastructure security computers may be arranged to associate privilege information with user roles (e.g., roles) or groups or categories of user roles. In some embodiments, privilege information may be considered to include one or more data structures that enable infrastructure security computers to associate privileges for accessing resources with user roles.

Accordingly, in some embodiments, users accessing the overlay network may be associated with one or more roles. Thus, in some embodiments, privilege information associated with a user role may be transferred or otherwise applied to users of assigned that user role.

Thus, in some embodiments, infrastructure security computers may be arranged to execute one or more authorization rules that compare privilege information associated with users (via user roles or custom privileges) with privilege requirements associated with resources.

In this example, for some embodiments, role 802 may be associated with privilege information 804. Further, in some embodiments, users, such as, user 806, user 808, or the like, may be associated with role 802. Thus, in this example, for some embodiments, privileges represented by privilege information 804 may be considered to be granted to user 806 and user 808. Similarly, in this example, for some embodiments, role 810 may be associated with privilege information 812. Further, in some embodiments, users, such as, user 814, user 816, or the like, may be associated with role 810. Thus, in this example, for some embodiments, privileges represented by privilege information 812 may be considered to be granted to user 814 and user 816.

Figure 9:
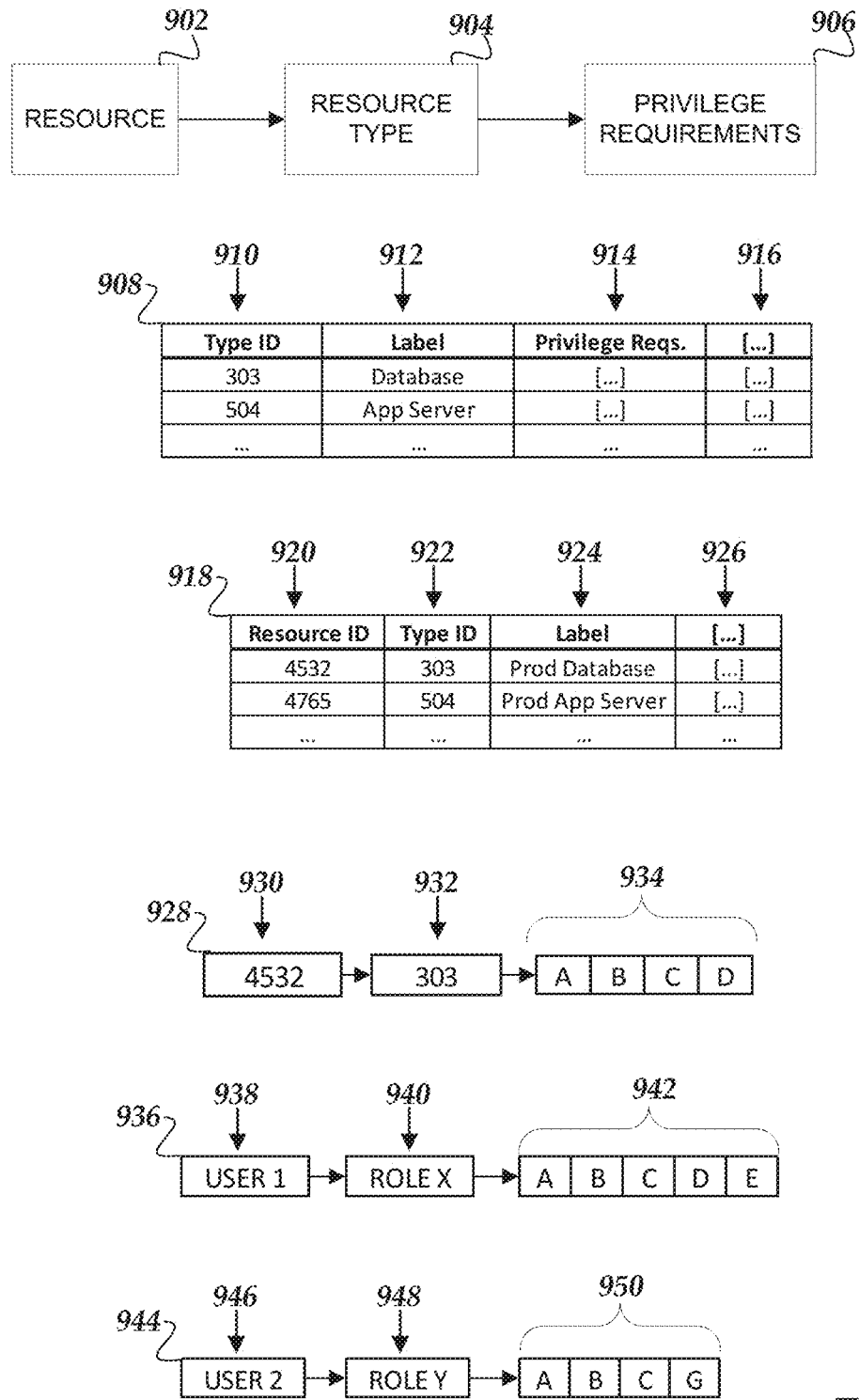
FIG. 9 illustrates a logical schematic of various data structures for connection revocation in overlay networks in accordance with one or more of the various embodiments.

FIG. 9 illustrates a logical schematic of various data structures for connection revocation in overlay networks in accordance with one or more of the various embodiments.

In one or more of the various embodiments, infrastructure security computers may be arranged to enable organizations to declare one or more resource types that may be employed to group or categorize resources that may be protected or otherwise accessible via the overlay network.

In one or more of the various embodiments, infrastructure security computers may be arranged to associate resources in the overlay network with a resource type. In some embodiments, infrastructure security computers may be arranged to enable organizations to declare one or more resource types to satisfy local requirements or local circumstances. In some embodiments, infrastructure security computers may be configured to include one or more "default" resource types as a convenience for users or administrators. Accordingly, in some embodiments, infrastructure security computers may be arranged to determine some or all resource types based on configuration information to account for local requirements or local circumstances. For example, in some embodiments, resource types may include, database, web server, application server, or the like.

In one or more of the various embodiments, infrastructure security computers may be arranged to associate one or more privilege requirements with resource types. In one or more of the various embodiments, infrastructure security computer may be arranged to employ one or more data structures to associate privilege requirements with resource types. Likewise, in some embodiments, infrastructure security computers may be arranged to employ one or more data structures to associate resource types with resources. In some embodiments, infrastructure security computers may provide one or more user interfaces that enable users to assign resources to particular resource types.

In this example, in some embodiments, resource 902 may be associated with resource type 904 which in turn may be associated with one or more privilege requirements, such as, privilege requirements 906.

In this example, for some embodiments, table 908 may be considered to represent a data structure for declaring resource types. Accordingly, in this example, table 908 may include: column 910 for storing resource type identifiers; column 910 for storing a human readable label for a resource type; column 914 for storing one or more privilege requirements; column 916 representing one or more other columns that may be included for storing additional attribute values that may be associated with a resource type; or the like.

Also, in this example, for some embodiments, table 918 may be considered to represent a data structure for declaring resources. Accordingly, in this example, table 910 may include: column 920 for storing resource identifiers; column 922 for storing an associated resource type identifier; column 924 for storing human readable labels for a resource; column 926 representing one or more other columns that may be included for storing additional attribute values (e.g., network addresses, network information, hostnames, utilization metrics, operational flags, status indicators, or the like) that may be associated with a resource; or the like.

Accordingly, in some embodiments, data structures, such as, table 908 or table 918 may be arranged to associate privilege requirements with particular resources.

Also, in this example, data structure 928 may represent a resource such that field 930 stores the resource identifier, field 932 stores the resource type, and field 934 stores the privilege requirements for resource '4532'.

Similarly, in this example, for some embodiments, data structure 936 may represent a user (e.g., user 1) such that field 938 stores a user identifier, field 940 stores a user role identifier for the user, and field 942 stores privilege information for user 1. Likewise, in this example, for some embodiments, data structure 944 may represent a user (e.g., user 2) such that field 946 stores a user identifier, field 948 stores a user role identifier for the user, and field 950 stores privilege information for user 2.

Accordingly, in some embodiments, infrastructure security computers may be arranged to determine if a user may be authorized to access a resource based on applying one or more privileges rules in view of the privilege requirements associated with the target resource and the privilege information associated with the user. Thus, in some embodiments, if an infrastructure security computer determines that the users privilege information matches the requirements imposed by a resource's privilege requirements, the user may be authorized to access a resource.

In this example, for some embodiments, infrastructure security computers may be considered to configured to employ a privilege rule that enables access to a resource if the privilege requirements associated with the resource are included in a user's privilege information. Thus, in this example, for some embodiments, user 1 (e.g., represented by data structure 936) may be granted access to resource '4532' (e.g., represented by data structure 928) because the privilege requirements (e.g., 'A', 'B', 'C', 'D') associated with resource '4532' are included in the privilege information of user 1. Likewise, in this example, for some embodiments, user 2 (e.g., represented by data structure 944) may be denied access to resource '4532' (e.g., represented by data structure 928) because the privilege requirements (e.g., 'A', 'B', 'C', 'D') associated with resource '4532' are not included in the privilege information of user 2.

Also, in some embodiments, data structures representing users or resources may be configured to include one or more additional fields for storing custom or specific privilege requirements or privilege information. Thus, in some cases, for some embodiments, a resource may be configured to have one or more additional privilege requirements along with the privilege requirements associated with its resource type. Also, in some cases, for some embodiments, a user may be configured to have additional privilege information along with the privilege information associated with its user role.

Note, this example discloses a privilege rule that compares tags/labels in the privilege requirements with the tags/labels with privilege information to determine if the user is authorized to access a resource. However, in some embodiments, other privilege rules are anticipated. Accordingly, in some embodiments, infrastructure security computers may be arranged to determine one or more privilege requirements based on configuration information to account for local circumstances or local requirements. For example, in some embodiments, different organizations may require different methods or conditions for authenticating a user. Accordingly, infrastructure security computers may be arranged to employ rules, instructions, libraries, condition information, constraint information, or the like, provided via configuration information to accommodate various requirements for some organizations.

Note, data structures, such as, table 908, table 918, data structure 928, data structure 936, data structure 944, or the like, may be implemented using a variety of data structures, including, arrays, linked lists, objects, tables, dictionaries, hash tables, or the like, without departing from the scope of these innovations. Likewise, in some embodiments, data structures may be implemented or supported using XML, JSON, database tables, or the like. Accordingly, in some embodiments, infrastructure security computers or mesh agents may employ instructions, libraries, or the like, provided via configuration information to provide support for various data structures, data formats, or the like. For example, if an organization may determine that it may be advantageous to support additional data structures or additional data formats, support for those additional data structures or data formats may be provided by including or modifying one or more libraries, one or more plugins, one or more extensions, or the like.

Generalized Operations

FIGS. 10-14 represent generalized operations for connection revocation in overlay networks in accordance with one or more of the various embodiments. In one or more of the various embodiments, processes 1000, 1100, 1200, 1300, and 1400 described in conjunction with FIGS. 10-14 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 10-14 may be used for managing and monitoring endpoint activity in secured networks in accordance with at least one of the various embodiments or architectures such as those described in conjunction with FIGS. 4-9. Further, in one or more of the various embodiments, some or all of the actions performed by processes 1000, 1100, 1200, 1300, and 1400 may be executed in part by infrastructure security engine 322, one or more mesh agents, such as, mesh agent 324, or the like, running on one or more processors of one or more network computers.

Figure 10:
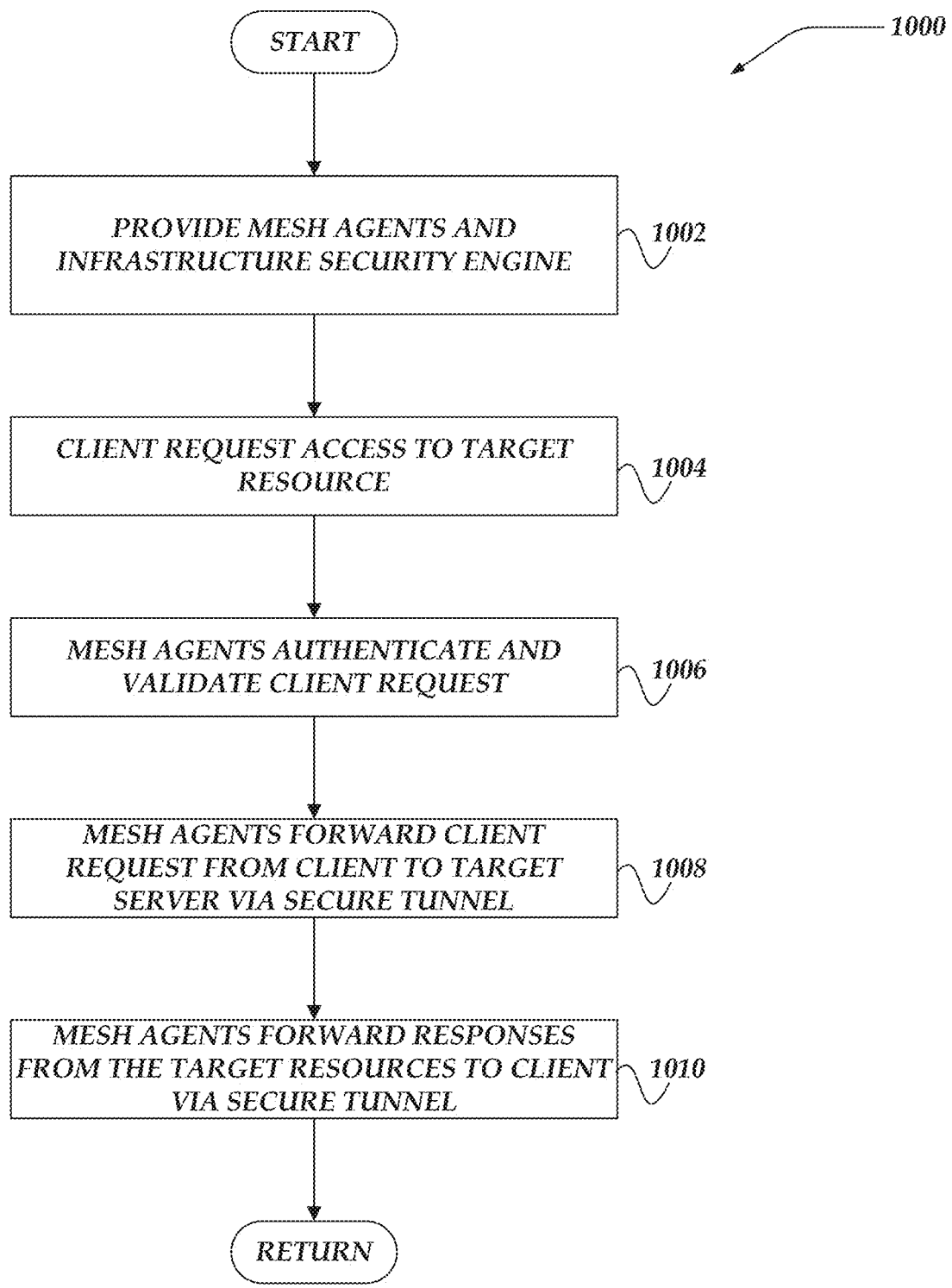
FIG. 10 illustrates an overview flowchart of a process for connection revocation in overlay networks in secured networks in accordance with one or more of the various embodiments.

FIG. 10 illustrates an overview flowchart of process 1000 for connection revocation in overlay networks in secured networks in accordance with one or more of the various embodiments. After a start block, at block 1002, in one or more of the various embodiments, one or more mesh agents and one or more infrastructure security engines may be provided. At block 1004, in one or more of the various embodiments, mesh agents may be provided a client request to access a target resource. At block 1006, in one or more of the various embodiments, mesh agents may be arranged to communicate with one or more infrastructure security engines to authenticate or validate the client requests. At block 1008, in one or more of the various embodiments, mesh agents may be arranged to forward validated/authenticated client requests to target resources via a secure tunnel in the overlay network. At block 1010, in some embodiments, mesh agents may be arranged to forward responses from the target resource to the client via the secure tunnel. Next, in one or more of the various embodiments, control may be returned to a calling process.

Figure 11:
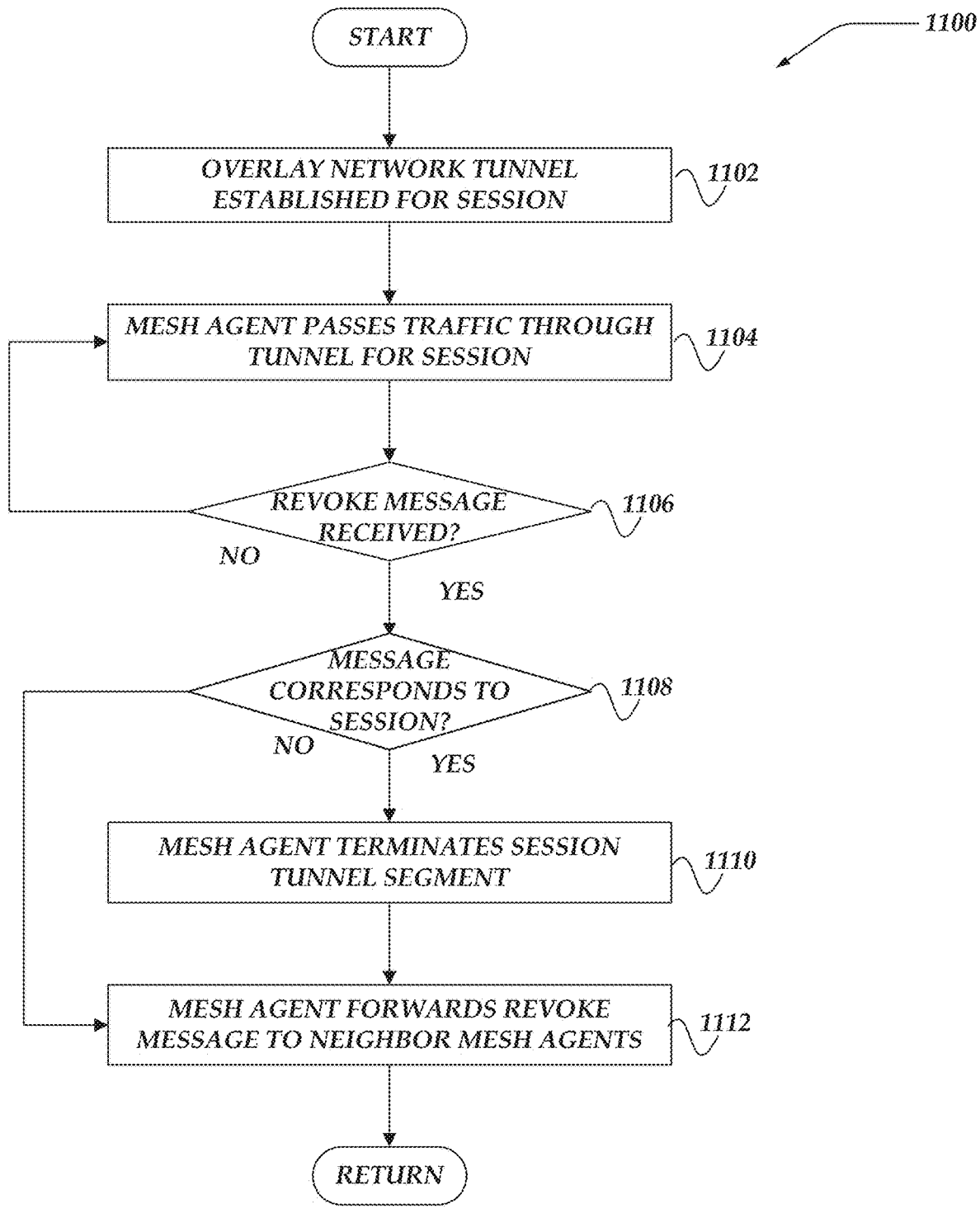
FIG. 11 illustrates a flowchart of a process for connection revocation in overlay networks in secured networks in accordance with one or more of the various embodiments.

FIG. 11 illustrates a flowchart of process 1100 for connection revocation in overlay networks in secured networks in accordance with one or more of the various embodiments. After a start block, at block 1102, in one or more of the various embodiments, an overlay network may be established for a session. As described above, in some embodiments, mesh agents or infrastructure security computers may be arranged to establish a secure tunnel between an ingress agent and an egress agent with zero or more mesh agents in between. Thus, in some embodiments, a user associated with the session has been authenticated and authorized to access the target resource.

At block 1104, in one or more of the various embodiments, mesh agents participating in the secure may be arranged to receive and forward network traffic associated with the session. In one or more of the various embodiments, if a secure tunnel has been established, the mesh agents that comprise the secure tunnel (including the ingress agent and the egress agent) may be arranged to forward network traffic from a client application used by the user to the target resource and forward network traffic from the target resource to the client application used by the user. In some embodiments, mesh agents may be arranged to rely on the secure tunnel rather than validate each network communication associated with the session.

Note, in some cases, for some embodiments, overlay networks or one or more mesh agents may be configured to perform additional actions, such as, traffic logging, event logging, measuring/accumulating metrics associated with a session, packet inspection for various policy enforcement, or the like. Generally, in some embodiments, these actions may be considered separate from authenticating the user with the infrastructure security computer.

At decision block 1106, in one or more of the various embodiments, if a mesh agent may be provided a revoke message, control may flow to decision block 1108; otherwise, control may loop back to block 1104. In some embodiments, infrastructure security computers may be arranged to communicate a message to revoke a users authorization to access a target resource. In some embodiments, infrastructure security computers may be arranged to maintain one or more data structures (e.g., tables, lists, or the like) that correspond to the active sessions in the overlay network. Accordingly, in some embodiments, infrastructure security computers may be arranged to track various session information, such as, session identifiers, target resource identifiers, user identifiers, timestamp information, tunnel routing information (e.g., how secure tunnels may route through the underlay network), session configuration information, one or more traffic related metrics, or the like.

Accordingly, in some embodiments, infrastructure security computers may determine that one or more sessions should be terminated for various reasons. In some embodiments, infrastructure security computers may be arranged to regularly apply one or more privilege rules to determine if the current privilege information associated with a session user meets the privilege requirements associated with a target resource of the session.

In some embodiments, infrastructure security computers may be arranged to periodically evaluate if users in pending sessions may remain authorized to access the target resources in those pending session. In some embodiments, infrastructure security computers may enable administrative users to configure the period for evaluate session authorization. Accordingly, in some embodiments, different time periods may be declared for different users, roles, resources, resource types, or the like. For example, in some embodiments, sensitive resources may be configured to have shorter evaluation periods that less sensitive resources.

Also, in some embodiments, infrastructure security computers may be arranged to provide one or more user interfaces that may enable administrative users to modify the privilege requirements associated with resources or resource types. Also, in some embodiments, infrastructure security computers may be arranged to provide one or more user interfaces that may enable administrative user to modify privilege information associated with users or user roles. Accordingly, in some embodiments, infrastructure security computers may be arranged to automatically reevaluate the access privileges associated with active sessions if privilege requirements for resources/resource type of privilege information for users/user-roles may have been changed.

In one or more of the various embodiments, infrastructure security computers may be arranged to enable one or more evaluation rules to be associated with various sessions. In some embodiments, evaluation rules may declare one or more conditions that may trigger infrastructure security computers to evaluate the authorization status for some or all of their pending sessions.

Also, in some embodiments, infrastructure security computers may provide one or more user interfaces that enable an administrative user to manually select one or more sessions for revocation.

In one or more of the various embodiments, infrastructure security computers may be arranged to broadcast revoke messages to some or all of the mesh agents in the overlay network. In some embodiments, infrastructure security computers may be configured to determine one or more mesh agents that may be provided revoke messages based on one or more administrative or security policies. Accordingly, in some embodiments, infrastructure security computers may be arranged to determine which mesh agents may be provided the revoke message(s) based on the one or more policies. For example, policies may provide for: selecting all mesh agents in the overlay network; restricting revoke messages to mesh agents participating in the session/secure tunnel; or the like.

Also, in some embodiments, infrastructure security computers may be configured to determine the one or more mesh agents to send revoke messages by a random sampling of mesh agents associated with the revocable sessions. Accordingly, in some embodiments, infrastructure security computers may be configured to reduce the bandwidth impact of sending many revoke messages at the same time.

In some embodiments, overlay networks may be arranged to automatically route traffic around missing, dropped, or disabled mesh agents as part of a automatic route/tunnel repair policy. Accordingly, in some embodiments, infrastructure security computers may be arranged to provide revoke messages to each mesh agent in the overlay network to reduce the likelihood that mesh agents may route around other interposed mesh agents that revoke a session.

At decision block 1108, in one or more of the various embodiments, if the revoke message may be associated with a session associated with the mesh agent, control may flow to block 1110; otherwise, control may flow to block 1112. In one or more of the various embodiments, in response to receiving revoke messages, mesh agents may be arranged to determine if the revoke messages may be associated with sessions or secure tunnels associated with the mesh agents. Accordingly, in some embodiments, infrastructure security computers may be arranged to include session identifiers in the revoke messages to enable mesh agents to determine if they may be associated with the revocable sessions. Thus, in some embodiments, mesh agents may be arranged to compare the identifiers of the revocable session with the session identifiers of session that the mesh agents may be part of.

At block 1110, in one or more of the various embodiments, the mesh agent may be arranged to terminate the secure tunnel segment that may be associated with the session being revoke. In one or more of the various embodiments, mesh agents may be arranged to close the connections in both or either directions of the session. In some embodiments, mesh agents may be arranged to have a connection to an upstream (in the secure tunnel) mesh agent and another connection to a downstream mesh agent. Accordingly, in some embodiments, mesh agents may be arranged to send a close or disconnect message directly through the connection endpoints associated with the revocable sessions rather than sending application protocol messages intended for the client application at the ingress agent or the target resource. For example, in some embodiments, if a revocable sessions is using a TCP/IP-like communication protocol, mesh agents may be arranged to send FIN messages to begin a graceful TCP connection shutdown or a RST message to immediately shutdown the connection. In some embodiments, infrastructure security computers may be arranged to include an indicator in the revoke message to indicate if a graceful shutdown or immediate/emergency shutdown should be performed. Also, in some embodiments, infrastructure security computers may be configured to default to either a graceful shutdown procedure or immediate/emergency shutdown procedure.

At block 1112, in one or more of the various embodiments, the mesh agent may be arranged to forward the revoke message to one or more neighboring mesh agents in the overlay network. In one or more of the various embodiments, mesh agents may be configured to forward the revoke message to one or more other mesh agents via a control plane network channel via the underlay network. Accordingly, in some embodiments, mesh agents that may be out of contact with the infrastructure security computer may be provided the revoke messages via their neighbor mesh agents.

In some embodiments, mesh agents may be arranged to forward the revoke messages to the one or more mesh agents that may be adjacent to it within the secure tunnel. Also, in some embodiments, mesh agents may be configured to forward the revoke message to some or all of the other mesh agents in the overlay network. For example, if the number of mesh agents in an overlay network may be above a threshold value (e.g., large size networks), mesh agents may be configured to forward to the revoke message to fewer mesh agents to avoid a cascade of revoke messages that may impact the overall performance of the underlay network or the overlay network.

Next, in one or more of the various embodiments, control may be returned to a calling process.

Figure 12:
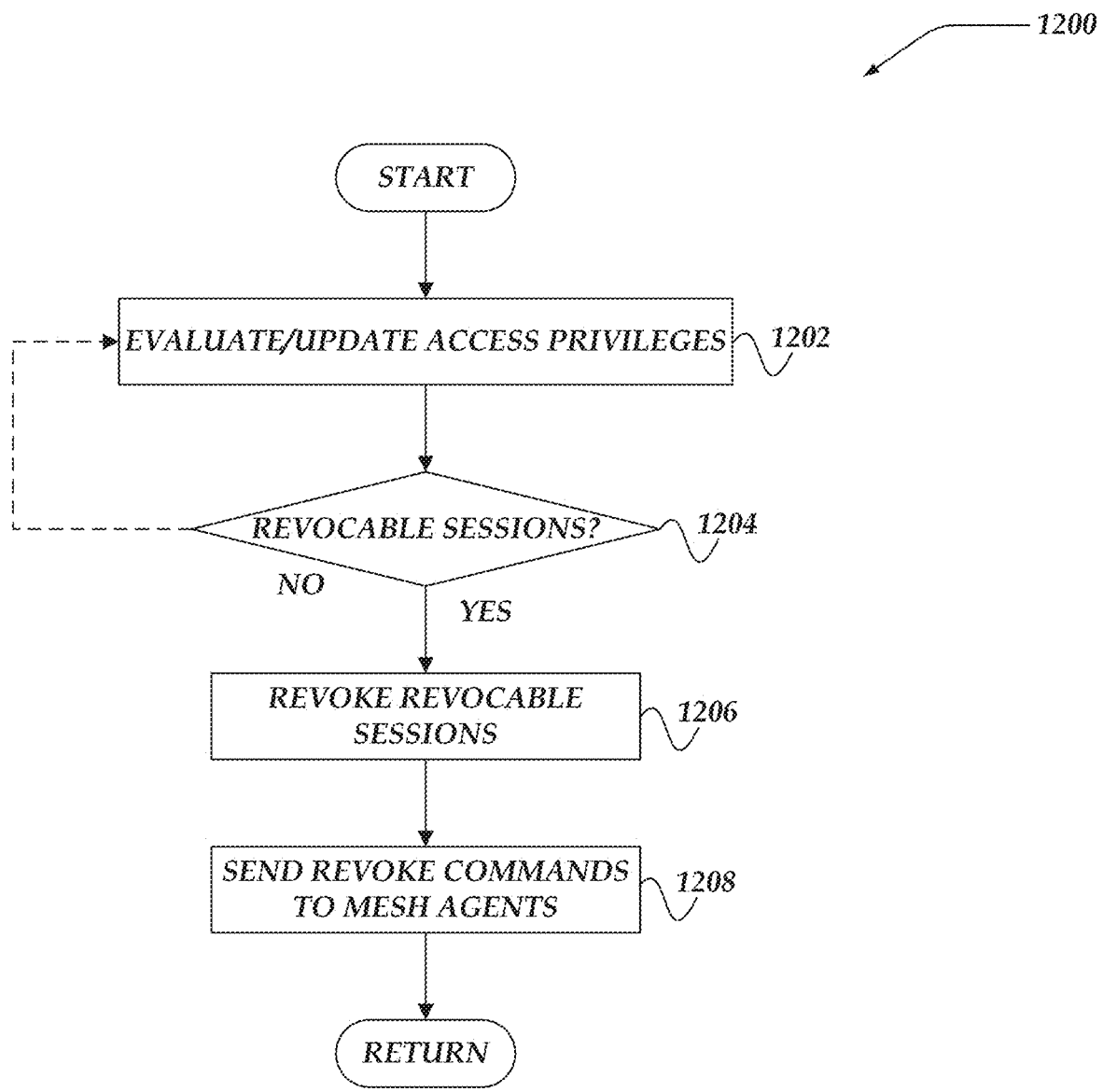
FIG. 12 illustrates a flowchart of a process for connection revocation in overlay networks in secured networks in accordance with one or more of the various embodiments.

FIG. 12 illustrates a flowchart of process 1200 for connection revocation in overlay networks in secured networks in accordance with one or more of the various embodiments. After a start block, at block 1202, in one or more of the various embodiments, infrastructure security computers may be arranged to evaluate/update access privileges associated with one or more of resources, resource types, users, roles, or the like.

As described above, in some embodiments, infrastructure security computers may be configured to employ various triggers for evaluating the access privilege for active sessions, such as, timers, conditions, manual selection, changes to privilege requirements of resources/resource types, changes to privilege information of users/user-roles, or the like.

In one or more of the various embodiments, infrastructure security computers may be arranged to evaluate some or all of the active sessions in the overlay network. In some embodiments, one or more triggering events may impact which sessions may be evaluated. For example, if a user changes the privilege requirements for a resource, infrastructure security computers may be arranged to automatically evaluate the access privileges for sessions that involve that resource. Likewise, in some embodiments, if an administrative user modifies the privilege information for a user role, sessions that involve users having the modified role may be evaluated for access privileges.

Likewise, in some embodiments, other triggering rules based on resource types, timers, or other metrics may activate an evaluation of the access privileges for one or more sessions. For example, in some embodiments, an infrastructure security computer may be configured to initiate an access privileges evaluation for each session that lives longer than a defined threshold duration. Also, for example, in some cases, infrastructure security computers may be configured to periodically evaluate access privileges for each session every n-minutes or n-seconds. In some embodiments, infrastructure security computers may be arranged to employ rules, instructions, conditions, or the like, provided via configuration information to determine if access privilege evaluations may occur. Thus, in some embodiments, infrastructure security computers may be readily adapted to support various local requirements or local circumstances.

In one or more of the various embodiments, infrastructure security computers may be arranged to determine one or more privilege rules for evaluating if a session should be revoked. In some embodiments, privilege rules may be defined for the overlay network as a whole. Also, in some embodiments, privilege rules may be associated with one or more of resources, resource type, users, or user roles. Accordingly, in some embodiments, infrastructure security computers may be configured to employ different privilege rules for different resource types, or the like.

For example, in one or more of the various embodiments, a privilege rule may direct an infrastructure security computer to compare the privilege information associated with users with the privilege requirements of resources in a given session to determine if a session may be revoked. In some embodiments, infrastructure security computers may be arranged to revoke a session if the privilege information of its associated user does not include all of the privilege requirements associated with the target resource of the session.

At decision block 1204, in one or more of the various embodiments, if the infrastructure security computers determine one or more revocable sessions, control may flow to block 1206; otherwise, control may loop back to block 1202. Note, the connection arrow from decision block 1204 to block 1202 represent how infrastructure security computers may be configured evaluate access privileges if various conditions or triggers may occur. Thus, in some embodiments, infrastructure security computers may continuously evaluate access privilege for sessions as per one or more triggering conditions/events.

At block 1206, in one or more of the various embodiments, the infrastructure security computers may be arranged to revoke one or more revocable sessions. In some embodiments, infrastructure security computers may update data structures, such as, session tables, or the like, to indicate that the revocable sessions are revoked. Accordingly, in some embodiments, infrastructure security computers may update a field in a session table to indicate that a session is revoked. Also, in some embodiments, infrastructure security computers may be arranged to delete or otherwise remove a session record from the session tables to indicate it has been revoked.

At block 1208, in one or more of the various embodiments, infrastructure security computers may be arranged to provide one or more revoke messages to one or more mesh agents in the overlay network. In one or more of the various embodiments, the session information maintained by infrastructure security computers may include identifiers, network addresses, or the like, associated with the mesh agents associated with a revocable session. Accordingly, in some embodiments, infrastructure security computers may employ this information to determine the mesh agents that may be provided the revoke message. As mentioned above, in some embodiments, infrastructure security computers may be configured to employ various strategies for selecting which mesh agent to send the revoke messages. In some embodiments, infrastructure security computers may be arranged to provide a revoke message for each mesh agent in the overlay network whether it may currently be associated with a revocable session.

Next, in one or more of the various embodiments, control may be returned to a calling process.

Figure 13:
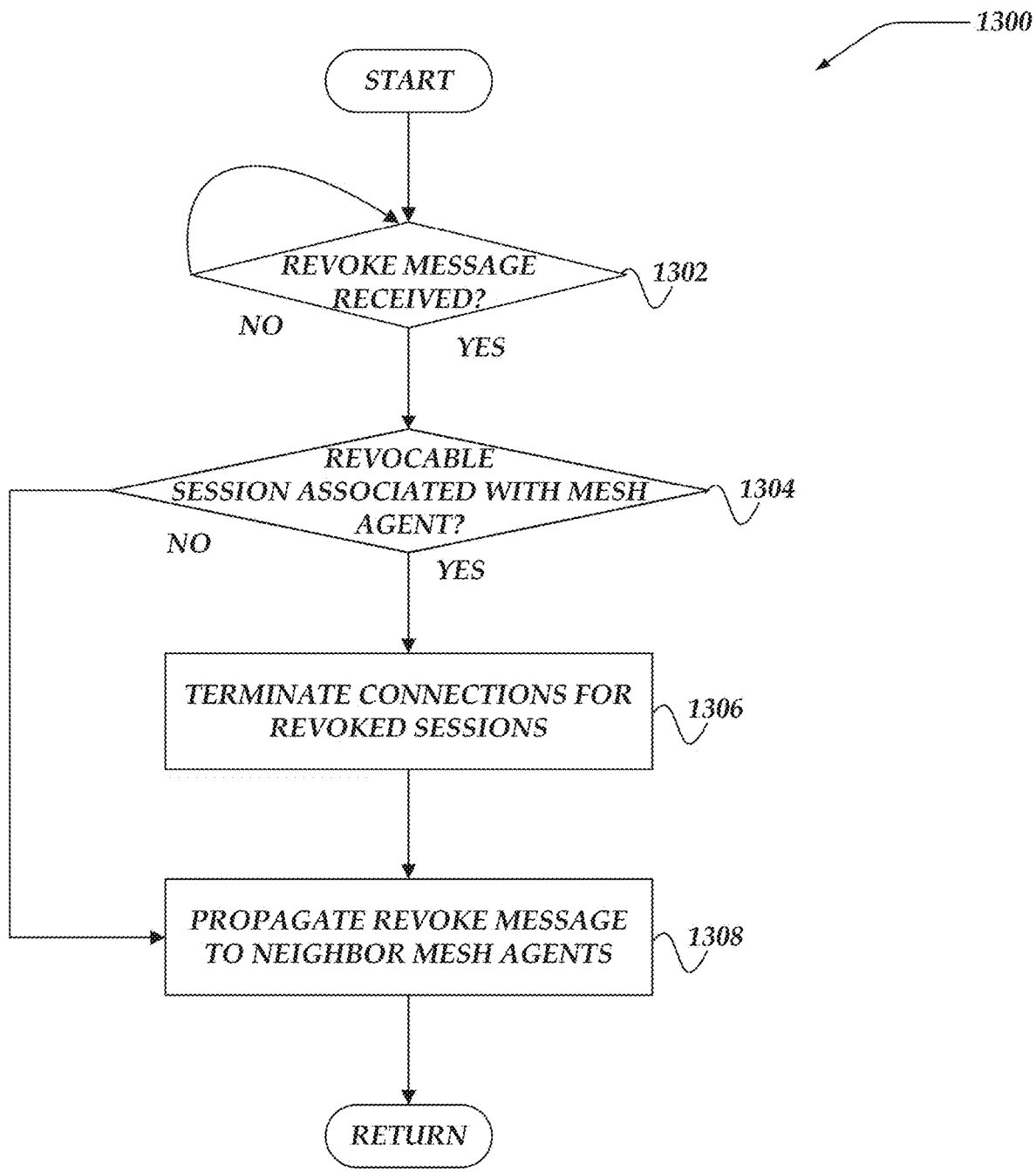
FIG. 13 illustrates a flowchart of a process for connection revocation in overlay networks in secured networks in accordance with one or more of the various embodiments.

FIG. 13 illustrates a flowchart of process 1300 for connection revocation in overlay networks in secured networks in accordance with one or more of the various embodiments. After a start block, at decision block 1302, in one or more of the various embodiments, if a mesh agent may be provided a revoke message, control may flow to decision block 1304; otherwise, control may loop back to decision block 1302. As described above, in some embodiments, infrastructure security computers may be arranged to evaluate the access privileges for active sessions for a variety of reasons. Thus, in some embodiments, if an infrastructure security computer determines that a user in an active session has lost their privilege to access the target resource, mesh agents may be provided a revoke message for that session.

At decision block 1304, in one or more of the various embodiments, if a session associated with a revoke message may be associated with the mesh agent, control may flow to block 1306; otherwise, control may flow to block 1308.

In one or more of the various embodiments, infrastructure security computers may be arranged to provide revoke messages to some or all the mesh agents in an overlay network. In some cases, in some embodiments, infrastructure security computers may be arranged to send revoke messages to some or all mesh agents that may associated with a revocable session. Also, in some embodiments, one or more mesh agents that have received a revoke message may forward the revoke messages to one or more other mesh agents. Thus, in some cases, the revoke message may be provided by another mesh agent rather than being provided by an infrastructure security computer.

Accordingly, in some embodiments, mesh agents may be arranged to determine a session identifier from the revoke message. In some embodiments, mesh agents may be arranged to scan a collection of local active sessions to determine if the session referenced by the revoke message may be locally active.

At block 1306, in one or more of the various embodiments, mesh agents may be arranged to terminated the connections for the revoked sessions. In some cases, in some embodiments, the mesh agent receiving the revoke message may be configured to maintain a separate connection with the adjacent upstream mesh agent and the adjacent downstream mesh agent in the secure tunnel corresponding to the revocable session. Accordingly, in some embodiments, the mesh agent may be arranged to terminate each connection associated with the revocable session. In some embodiments, mesh agent may be arranged to employ communication protocol messages to terminate the connections rather than attempting to employ application protocol commands. Thus, in some embodiments, the connections associated with a revocable session may be closed at the communication protocol layer.

In some cases, for some embodiments, the communication protocol may support so-called graceful shutdowns or abrupt/immediate shutdowns. Accordingly, in some embodiments, the revoke message may include an indicator if the connections should be close gracefully or abruptly. Also, in some embodiments, overlay network (e.g., infrastructure security computers) may be arranged to configured to employ either graceful connection termination or abrupt connection termination by default.

At block 1308, in one or more of the various embodiments, mesh agents may be arranged to propagate the revoke messages to one or more neighbor mesh agents.

In one or more of the various embodiments, mesh agent may be arranged to forward the revoke message to other mesh agents to increase the likelihood of the revoke message reaching all relevant mesh agents. For example, in some embodiments, if an infrastructure security computer broadcasts a revoke message to mesh agents in the overlay network, there may be one or more mesh agents that for unknown reasons or undiscovered reasons have not received the revoke message from the infrastructure security computer.

Accordingly, in some embodiments, mesh agents may be arranged to forward the revoke message to one or more neighbor mesh agents. In some cases, for some embodiments, a mesh agent that receives revoke message may forward to one or more mesh agent that it may access. In some cases, the mesh agent may forward the revoke message to the other mesh agent that may be adjacent to it withing the secure tunnel associated with the revocable session. Also, in some embodiments, mesh agents may be configured to forward to revoke message to each mesh agent that the mesh agent is aware off. In some embodiments, the mesh agent may forward to revoke message to each mesh agent associated with other active session that may be associated with the mesh agent.

As described above, in some embodiments, during the establishment of the secure tunnel for the session, the infrastructure security computer may have provided the mesh agent a list of optional routes to advance the secure tunnel towards the target resource. In some embodiments, mesh agents may be arranged to keep track of these optional routes/mesh agent so they may be used if a currently used mesh agent becomes unreachable. Accordingly, in some embodiments, mesh agent may be arranged to determine which mesh agents may be forwarded the revoke message based in part on the optional routes/mesh agent the were provided for the revocable sessions.

Next, in one or more of the various embodiments, control may be returned to a calling process.

Figure 14:
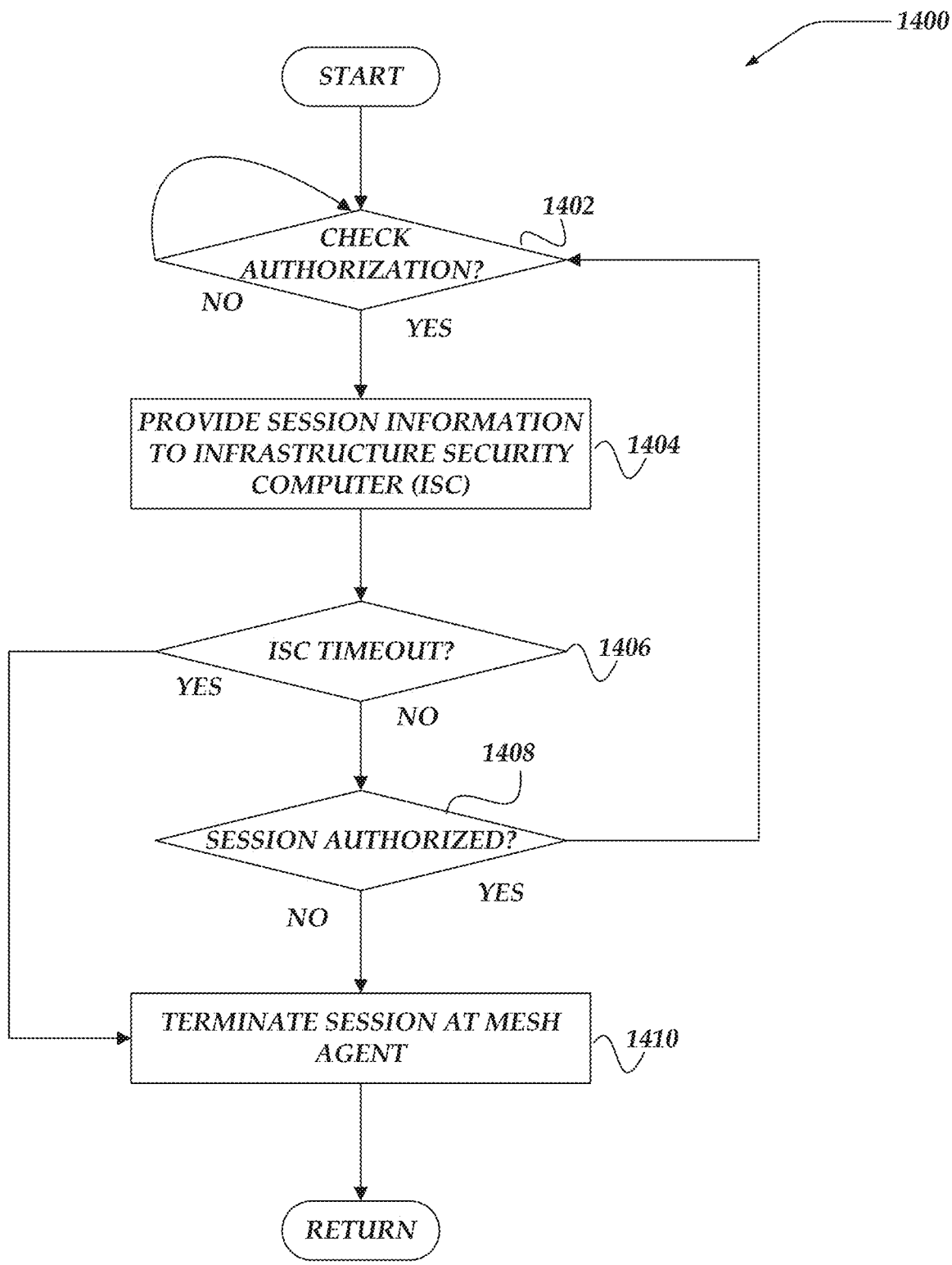
FIG. 14 illustrates a flowchart of a process for connection revocation in overlay networks in secured networks in accordance with one or more of the various embodiments.

FIG. 14 illustrates a flowchart of process 1400 for connection revocation in overlay networks in secured networks in accordance with one or more of the various embodiments. After a start block, at decision block 1402, in one or more of the various embodiments, if a session authorization check may be performed, control may flow to block 1404; otherwise, control may loop back to decision block 1402. In one or more of the various embodiments, mesh agents may be arranged to periodically request authorization confirmation for one or more sessions. In some embodiments, mesh agents may be arranged to request authorization confirmation upon the expiration of one or more declared timeout values. Further, in some embodiments, mesh agents may be arranged to monitor the duration of individual sessions. Accordingly, in some embodiments, mesh agents may be arranged to request that individual sessions be re-authorized based on the duration of the individual sessions.

In one or more of the various embodiments, mesh agents or the overlay network as a whole may be configured to have a global/default timeout duration that may trigger a re-authorization request. Also, in some embodiments, mesh agents may be arranged to associate different timeout values with different sessions. In some embodiments, infrastructure security computers may be arranged to include timeout information for sessions as part of the initial establishment of the secure tunnel associated with a session.

Also, in some embodiments, mesh agents may be arranged to request re-authorization in response to unexpected network communication issues. For example, if a mesh agent's connections into a secure tunnel exhibit erroneous behavior, the mesh agent may request re-authorization for the associated sessions. In some embodiments, mesh agents may be arranged to apply one or more rules, instructions, conditions, or the like, provided via configuration information to determine if a session requires re-authorization to account for local requirements or local circumstances.

At block 1404, in one or more of the various embodiments, mesh agents may be arranged to provide session information to an infrastructure security computer. In one or more of the various embodiments, mesh agents may be arranged to have limited information about the sessions. In one or more of the various embodiments, mesh agents may determine one or more of a session identifier, a user identifier, or a resource identifier based on the local session information.

Accordingly, in some embodiments, mesh agents may be arranged to include information such as session identifiers, user identifiers, resource identifiers, or the like, in a re-authorization request that may be provided to an infrastructure security computer.

At decision block 1406, in one or more of the various embodiments, if the infrastructure security computer fails to respond to the session authorization request, control may flow to block 1410; otherwise, control may flow to decision block 1408. In one or more of the various embodiments, if the mesh agent may be unable to communicate the re-authorization request to the infrastructure security computer, it may be arranged to consider the session as being compromised or otherwise unauthorized. Thus, in some embodiments, mesh agents may be arranged to determine that the infrastructure security computer may be unavailable or unreachable upon the expiry of a declared timeout value. Note, in some embodiments, the timeout value may vary depending on local circumstances or local requirements. Accordingly, in some embodiments, the timeout value may be determined based on configuration information.

At decision block 1408, in one or more of the various embodiments, if the infrastructure security computer indicates that the session is authorized, control may be loop back to decision block 1402; otherwise, control may flow to block 1410. In one or more of the various embodiments, infrastructure security computers that may receive a request to re-authorize a session may be arranged to evaluate the privilege information, privilege requirements, or privilege rules associated with the session to determine if the session remains authorized. In one or more of the various embodiments, if the session remains authorized, the infrastructure security computers may communicate the authorized status of the session to the mesh agents that requested re-authorization of the session.

Also, in some embodiments, if the infrastructure security computer determines that the session is revocable, the infrastructure security computer may perform the one or more action described above to revoke the session for the overlay network and shutdown its associated secure tunnel.

At block 1410, in one or more of the various embodiments, mesh agents may be arranged to terminate the session. In some embodiments, if the infrastructure security computer reports that the session is revocable the mesh agent may terminate the session as described above. Note, in some embodiments, if the infrastructure security computers designated the session as revocable, the infrastructure security computers may generate and provide one or more revoke messages to one or more mesh agents in the overlay network as described in more detail above.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors that are configured to execute instructions that are configured to cause performance of actions, comprising:
    determining one or more sessions associated with one or more secure tunnels in one or more network connections in an overlay network between one or more clients and one or more resources based on a response to a privilege evaluation event in the overlay network;
    comparing privilege information associated with each user to one or more privilege requirements associated with each resource that is determined to be associated with a same session as each user, wherein one or more mismatches in the comparison are employed to determine one or more revocable sessions; and
    generating one or more revoke messages that are sent to a portion of a plurality of agents that are randomly sampled to reduce a bandwidth impact of sending the one more revoke messages at the same time for closing one or more portions of connections associated with the one or more revocable sessions, wherein the portion of randomly sampled agents send one or more communication protocol messages to one or more infrastructure security engines for a communication protocol layer to cause termination of the one or more portions of the network connections.

2. The method of claim 1, further comprising:
    employing each of the plurality of agents associated with each session to periodically recommunicate a re-authorization request for each associated session to an infrastructure security computer (ISC); and
    employing each of the plurality of associated agents to terminate each session that is associated with a re-authorization request that is non-authorized by the ISC.

3. The method of claim 1, wherein sending the one or more revoke messages to the one or more agents, further comprises:
    employing each agent associated with each revoked session to forward the one or more revoke messages to one or more neighbor agents based on a proximity of the one or more agents to the one or more neighbor agents in the overlay network.

4. The method of claim 1, further comprising:
    configuring one or more of the plurality of agents that are based on a logical edge of the overlay network to operate as an ingress agent that one or more of a client application or a user employs to gain access to the one or more resources through the overlay network.

5. The method of claim 1, further comprising:
    configuring one or more of the plurality of agents that are based on a logical edge of the overlay network to operate as an egress agent that directly accesses the one or more resources through the overlay network.

6. The method of claim 1, further comprising:
    initiating the privilege evaluation event based on one or more modifications to the privilege information associated with each user or the one or more privilege requirements associated with the one or more resources.

7. The method of claim 1, the comparison further comprises:
    associating a role with each user and the privilege information;
    employing the privilege information associated with the role to determine one or more user privilege attributes for each user;
    associating the one or more privilege requirements with a resource type for the one or more resources;
    determining one or more resource privilege attributes for each resource associated with the one or more privilege requirements; and
    determining the one or more mismatches based on one or more of one or more resource privilege attributes being absent from the one or more user privilege attributes.

8. A network computer for managing access to network resources, comprising:
    a memory that stores at least instructions; and
    one or more processors that execute instructions that are configured to cause performance of actions, including:
        determining one or more sessions associated with one or more secure tunnels in one or more network connections in an overlay network between one or more clients and one or more resources based on a response to a privilege evaluation event in the overlay network;
        comparing privilege information associated with each user to one or more privilege requirements associated with each resource that is determined to be associated with a same session as each user, wherein one or more mismatches in the comparison are employed to determine one or more revocable sessions; and generating one or more revoke messages that are sent to a portion of a plurality of agents that are randomly sampled to reduce a bandwidth impact of sending the one more revoke messages at the same time for closing one or more portions of connections associated with the one or more revocable sessions, wherein the portion of randomly sampled agents send one or more communication protocol messages to one or more infrastructure security engines for a communication protocol layer to cause termination of the one or more portions of the network connections.

9. The network computer of claim 8, further comprising:
employing each of the plurality of agents associated with each session to periodically recommunicate a re-authorization request for each associated session to an infrastructure security computer (ISC); and
employing each of the plurality of associated agents to terminate each session that is associated with a re-authorization request that is non-authorized by the ISC.

10. The network computer of claim 8, wherein sending the one or more revoke messages to the one or more agents, further comprises:
employing each agent associated with each revoked session to forward the one or more revoke messages to one or more neighbor agents based on a proximity of the one or more agents to the one or more neighbor agents in the overlay network.

11. The network computer of claim 8, further comprising:
configuring one or more of the plurality of agents that are based on a logical edge of the overlay network to operate as an ingress agent that one or more of a client application or a user employs to gain access to the one or more resources through the overlay network.

12. The network computer of claim 8, further comprising:
configuring one or more of the plurality of agents that are based on a logical edge of the overlay network to operate as an egress agent that directly accesses the one or more resources through the overlay network.

13. The network computer of claim 8, further comprising:
initiating the privilege evaluation event based on one or more modifications to the privilege information associated with each user or the one or more privilege requirements associated with the one or more resources.

14. The network computer of claim 8, further comprises:
associating a role with each user and the privilege information;
employing the privilege information associated with the role to determine one or more user privilege attributes for each user;
associating the one or more privilege requirements with a resource type for the one or more resources;
determining one or more resource privilege attributes for each resource associated with the one or more privilege requirements; and
determining the one or more mismatches based on one or more of one or more resource privilege attributes being absent from the one or more user privilege attributes.

15. A non-transitory processor readable storage media that includes instructions for managing access to network resources over a network, wherein execution of the instructions, by one or more processors on one or more network computers, are configured to cause performance of actions, comprising:
determining one or more sessions associated with one or more secure tunnels in one or more network connections in an overlay network between one or more clients and one or more resources based on a response to a privilege evaluation event in the overlay network;
comparing privilege information associated with each user to one or more privilege requirements associated with each resource that is determined to be associated with a same session as each user, wherein one or more mismatches in the comparison are employed to determine one or more revocable sessions; and
generating one or more revoke messages that are sent to a portion of a plurality of agents that are randomly sampled to reduce a bandwidth impact of sending the one more revoke messages at the same time for closing one or more portions of connections associated with the one or more revocable sessions, wherein the portion of randomly sampled agents send one or more communication protocol messages to one or more infrastructure security engines for a communication protocol layer to cause termination of the one or more portions of the network connections.

16. The non-transitory processor readable storage media of claim 15, further comprising:
employing each of the plurality of agents associated with each session to periodically recommunicate a re-authorization request for each associated session to an infrastructure security computer (ISC); and
employing each of the plurality of associated agents to terminate each session that is associated with a re-authorization request that is non-authorized by the ISC.

17. The non-transitory processor readable storage media of claim 15, wherein sending the one or more revoke messages to the one or more agents, further comprises:
employing each agent associated with each revoked session to forward the one or more revoke messages to one or more neighbor agents based on a proximity of the one or more agents to the one or more neighbor agents in the overlay network.

18. The non-transitory processor readable storage media of claim 15, further comprising:
configuring one or more of the plurality of agents that are based on a logical edge of the overlay network to operate as an ingress agent that one or more of a client application or a user employs to gain access to the one or more resources through the overlay network.

19. The non-transitory processor readable storage media of claim 15, further comprising:
configuring one or more of the plurality of agents that are based on a logical edge of the overlay network to operate as an egress agent that directly accesses the one or more resources through the overlay network.

20. The non-transitory processor readable storage media of claim 15, further comprising:
initiating the privilege evaluation event based on one or more modifications to the privilege information associated with each user or the one or more privilege requirements associated with the one or more resources.

* * * * *

UNITED STATES PATENT AND TRADEMARK OFFICE
CERTIFICATE OF CORRECTION

PATENT NO. : 11,973,752 B2  
APPLICATION NO. : 18/238649  
DATED : April 30, 2024  
INVENTOR(S) : Crawford et al.

Page 1 of 1

It is certified that error appears in the above-identified patent and that said Letters Patent is hereby corrected as shown below:

In the Claims

In Column 37, Line 63, in Claim 1, delete "one more" and insert -- one or more --, therefor.

In Column 39, Line 7, in Claim 8, delete "one more" and insert -- one or more --, therefor.

In Column 40, Line 19, in Claim 15, delete "one more" and insert -- one or more --, therefor.

Signed and Sealed this  
Seventeenth Day of June, 2025

Coke Morgan Stewart  
*Acting Director of the United States Patent and Trademark Office*